(12) United States Patent
Marshall et al.

(10) Patent No.: US 7,946,334 B2
(45) Date of Patent: May 24, 2011

(54) SPRUE FORMERS

(75) Inventors: Michael Craig Marshall, Prior Lake, MN (US); Kerry Glewwe, Cottage Grove, MN (US)

(73) Assignee: Geodigm Corporation, Chanhassen, MN (US)

( * ) Notice: Subject to any disclaimer, the term of this patent is extended or adjusted under 35 U.S.C. 154(b) by 371 days.

(21) Appl. No.: 11/983,083

(22) Filed: Nov. 7, 2007

(65) Prior Publication Data
US 2008/0142183 A1 Jun. 19, 2008

Related U.S. Application Data

(60) Provisional application No. 60/857,600, filed on Nov. 7, 2006.

(51) Int. Cl.
*B22C 7/02* (2006.01)
*B22C 9/04* (2006.01)

(52) U.S. Cl. .............. 164/35; 164/45; 164/235

(58) Field of Classification Search .......... 164/34–36, 164/235, 45
See application file for complete search history.

(56) References Cited

U.S. PATENT DOCUMENTS

| | | | |
|---|---|---|---|
| 1,733,895 A | 10/1929 | Matteson, Jr. | |
| 2,194,790 A | 3/1940 | Glück | |
| 3,807,862 A | 4/1974 | Hatzenbuhler | |
| 4,081,019 A | 3/1978 | Kulig | |
| 4,206,545 A | 6/1980 | Lord | |
| 4,273,580 A | 6/1981 | Shoher et al. | |
| 4,411,626 A | 10/1983 | Becker et al. | |
| 4,611,288 A | 9/1986 | Duret et al. | |
| 4,663,720 A | 5/1987 | Duret et al. | |
| 4,741,378 A * | 5/1988 | Engelman et al. | 164/244 |
| 4,742,464 A | 5/1988 | Duret et al. | |
| 4,778,386 A | 10/1988 | Spiry | |
| 4,844,144 A | 7/1989 | Murphy et al. | |
| 4,850,873 A | 7/1989 | Lazzara et al. | |
| 4,869,666 A | 9/1989 | Talass | |
| 4,937,928 A | 7/1990 | van der Zel | |
| 4,952,149 A | 8/1990 | Duret et al. | |
| 4,972,897 A * | 11/1990 | Thomas | 164/35 |
| 5,004,037 A * | 4/1991 | Castaldo | 164/244 |
| 5,011,405 A | 4/1991 | Lemchen | |
| 5,027,281 A | 6/1991 | Rekow et al. | |

(Continued)

FOREIGN PATENT DOCUMENTS
DE 36 26 789 A1 2/1988
(Continued)

OTHER PUBLICATIONS

Hermanek, F., "Finding the Lost Wax Process," *Rusty Spike*, vol. 32, No. 1, pp. 5 and 7 (Jan.-Feb. 2002).

(Continued)

*Primary Examiner* — Kuang Lin
(74) *Attorney, Agent, or Firm* — Merchant & Gould P.C.

(57) ABSTRACT

A sprue former of the type used to produce a casting mold includes a generally hollow body or a body having hollow sections. The body includes an inlet forming member and at least one first interface member. The inlet forming member is configured to provide an inlet cavity in the casting mold to enable casting material to enter the casting mold. The first interface members are configured to couple to casting patterns. The casting patterns represent items to be cast. The body can also includes a reservoir forming member and at least one connecting member coupling the reservoir forming member to the inlet forming member.

22 Claims, 18 Drawing Sheets

U.S. PATENT DOCUMENTS

| | | | |
|---|---|---|---|
| 5,092,022 A | 3/1992 | Duret | |
| 5,121,333 A | 6/1992 | Riley et al. | |
| 5,139,419 A | 8/1992 | Andreiko et al. | |
| 5,232,361 A | 8/1993 | Sachdeva et al. | |
| 5,237,998 A | 8/1993 | Duret et al. | |
| 5,257,203 A | 10/1993 | Riley et al. | |
| 5,273,429 A | 12/1993 | Rekow et al. | |
| 5,338,198 A | 8/1994 | Wu et al. | |
| 5,368,478 A | 11/1994 | Andreiko et al. | |
| 5,378,154 A | 1/1995 | van der Zel | |
| 5,431,562 A | 7/1995 | Andreiko et al. | |
| 5,447,432 A | 9/1995 | Andreiko et al. | |
| 5,454,717 A | 10/1995 | Andreiko et al. | |
| RE35,169 E | 3/1996 | Lemchen et al. | |
| 5,518,397 A | 5/1996 | Andreiko et al. | |
| 5,588,832 A | 12/1996 | Farzin-Nia | |
| 5,683,243 A | 11/1997 | Andreiko et al. | |
| 5,690,490 A | 11/1997 | Cannon et al. | |
| 5,725,376 A | 3/1998 | Poirier | |
| 5,735,692 A | 4/1998 | Berger | |
| 5,909,765 A | 6/1999 | McDowell | |
| 6,015,289 A | 1/2000 | Andreiko et al. | |
| 6,042,374 A | 3/2000 | Farzin-Nia et al. | |
| 6,049,743 A | 4/2000 | Baba | |
| RE36,863 E | 9/2000 | Snyder | |
| 6,152,731 A | 11/2000 | Jordan et al. | |
| 6,174,168 B1 | 1/2001 | Dehoff et al. | |
| 6,177,034 B1 | 1/2001 | Ferrone | |
| 6,217,334 B1 | 4/2001 | Hultgren | |
| 6,227,850 B1 | 5/2001 | Chishti et al. | |
| 6,283,753 B1 | 9/2001 | Willoughby | |
| 6,287,121 B1 | 9/2001 | Guiot et al. | |
| 6,287,490 B2 | 9/2001 | Rheinberger et al. | |
| 6,322,728 B1 | 11/2001 | Brodkin et al. | |
| 6,354,836 B1 | 3/2002 | Panzera et al. | |
| 6,371,761 B1 | 4/2002 | Cheang et al. | |
| 6,398,554 B1 | 6/2002 | Perot et al. | |
| 6,409,504 B1 | 6/2002 | Jones et al. | |
| 6,460,594 B1 | 10/2002 | Lam | |
| 6,463,344 B1 | 10/2002 | Pavloskaia et al. | |
| 6,506,054 B2 | 1/2003 | Shoher et al. | |
| 6,532,299 B1 | 3/2003 | Sachdeva et al. | |
| 6,568,936 B2 | 5/2003 | MacDougald et al. | |
| 6,648,640 B2 | 11/2003 | Rubbert et al. | |
| 6,648,645 B1 | 11/2003 | MacDougald et al. | |
| 6,667,112 B2 | 12/2003 | Prasad et al. | |
| 6,691,764 B2 | 2/2004 | Embert et al. | |
| 6,835,066 B2 | 12/2004 | Iiyama et al. | |
| 6,915,178 B2 | 7/2005 | O'Brien et al. | |
| 7,228,191 B2 | 6/2007 | Hofmeister et al. | |
| 7,463,942 B2 | 12/2008 | O'Brien et al. | |
| 7,735,542 B2 | 6/2010 | Marshall et al. | |
| 2002/0015934 A1 | 2/2002 | Rubbert et al. | |
| 2002/0110786 A1 | 8/2002 | Diller | |
| 2004/0121291 A1 | 6/2004 | Knapp et al. | |
| 2004/0137408 A1* | 7/2004 | Embert et al. | 433/201.1 |
| 2004/0204787 A1 | 10/2004 | Kopelman et al. | |
| 2004/0220691 A1 | 11/2004 | Hofmeister et al. | |
| 2004/0265770 A1 | 12/2004 | Chapoulaud et al. | |
| 2005/0177261 A1 | 8/2005 | Durbin et al. | |
| 2005/0177266 A1 | 8/2005 | Kopelman et al. | |
| 2005/0236551 A1 | 10/2005 | Lee | |
| 2005/0251281 A1 | 11/2005 | O'Brien et al. | |
| 2006/0106484 A1 | 5/2006 | Saliger et al. | |
| 2006/0115793 A1 | 6/2006 | Kopelman et al. | |
| 2006/0115795 A1 | 6/2006 | Marshall et al. | |
| 2006/0122719 A1 | 6/2006 | Kopelman et al. | |
| 2008/0131846 A1 | 6/2008 | Marshall et al. | |
| 2008/0220395 A1 | 9/2008 | Marshall et al. | |
| 2009/0087818 A1 | 4/2009 | O'Brien et al. | |
| 2009/0148816 A1 | 6/2009 | Marshall et al. | |

FOREIGN PATENT DOCUMENTS

| | | |
|---|---|---|
| EP | 0 316 106 A1 | 5/1989 |
| EP | 0 322 257 A2 | 6/1989 |
| EP | 0 426 363 A2 | 5/1991 |
| EP | 0 502 227 B1 | 11/1996 |
| EP | 0 781 625 A1 | 7/1997 |
| EP | 1 006 931 B1 | 6/2000 |
| FR | 2 593 384 A1 | 7/1987 |
| GB | 2 296 673 A | 7/1996 |
| JP | 5-49651 | 3/1993 |
| JP | 10-118097 | 5/1998 |
| WO | WO 94/10935 | 5/1994 |
| WO | WO 95/15731 | 6/1995 |
| WO | WO 02/19940 A1 | 3/2002 |
| WO | WO 02/076327 A1 | 10/2002 |

OTHER PUBLICATIONS

Lewis, J., "Software beefs up tractor radiator-guard mount," *Design News*, vol. 54, No. 4, pp. 87-88 (Feb. 15, 1999) (1 page abstract).

Lost Wax Investment Casting Company, Cranston Casting Company Inc., www.cranstoncasting.com/process.htm, 2 pages (Date Retrieved Mar. 8, 2007).

Rotert, V., "How one rapid prototyping method is able to eliminate tooling for investment casting," *Proceedings of the 45th Annual Technical Meeting and Exhibition Investment Casting Institute*, Atlanta, Georgia (1997) (1 page abstract).

Weeden, B. et al., "Alternative methods for custom implant production utilizing a combination of rapid prototyping technology and conventional investment casting," *Proceedings of the 1996 15th Southern Biomedical Engineering Conference*, Dayton, Ohio (1996) (1 page abstract).

Wirtz, H. et al., "Investment casting shells in 1 day using selective laser sintering (SLS)," *Proceedings of the 24th BICTA Conference on Investment Casting*, Oxford, GB (1999) (1 page abstract).

Wu, M. et al., "Application of rapid prototyping and numerical simulation in titanium dental castings," *Computer Assisted Surgery & Rapid Prototyping in Medicine*, 5th Int. Workshop (1999) (1 page abstract).

International Search Report and Written Opinion mailed May 20, 2008.

Cad Cam Ventures, Auto-Milled Crown and the Cad Cam Ventures, 13 pages (Feb. 1999).

Cicero, It's Time for Digital Solutions, Brochure, 12 pages (Apr. 1999).

DCS Dental AG, The Precident System, 16 pages (Apr. 1999).

Dental Laboratory Technology, Fixed Restorative Techniques, Section 13 Spruing and Investing, pp. 149-180 (1972).

Dentalmatic Technologies, Inc., "Premiering a Dental Lab Tool that Eliminates Waxing, Investing, Casting, Increases Productivity and Improves Labor Efficiency," 8 pages (Publicly known at least as early as Sep. 6, 2000).

Denzir, "Denzir—for Superior Dental Restorations!," 14 pages (Publicly known at least as early as Sep. 6, 2000).

Model Maker II, Sanders Prototype, Inc., The High Precision 3-D Modeling System, Brochure, 10 pages (Jul. 2000).

Seymour, K. et al., "Assessment of shoulder dimensions and angles of porcelain bonded to metal crown preparations," *The Journal of Prosthetic Dentistry*, vol. 75, No. 4, pp. 406-411 (Apr. 1996).

Sohmura et al., "Use of CAD/CAM system to fabricate dental prostheses. Part 1: CAD for a clinical crown restoration," *The International Journal of Prosthodontics*, vol. 8, No. 3, pp. 252-258 (1995).

Tamura, K., "Procelain-Fused-to-Metal Crowns," *Essential of Dental Technology*, pp. 356-359 (1987).

* cited by examiner

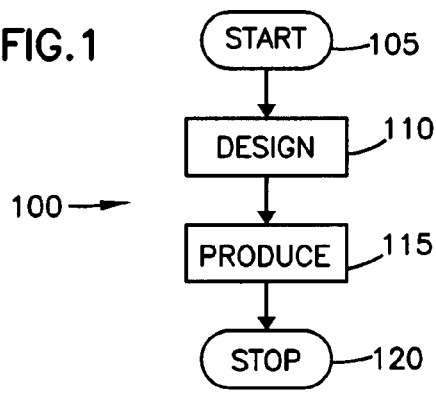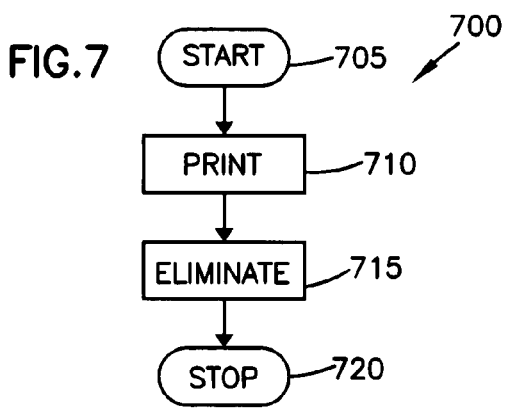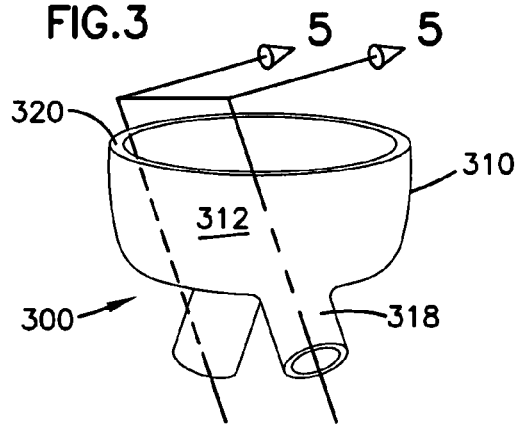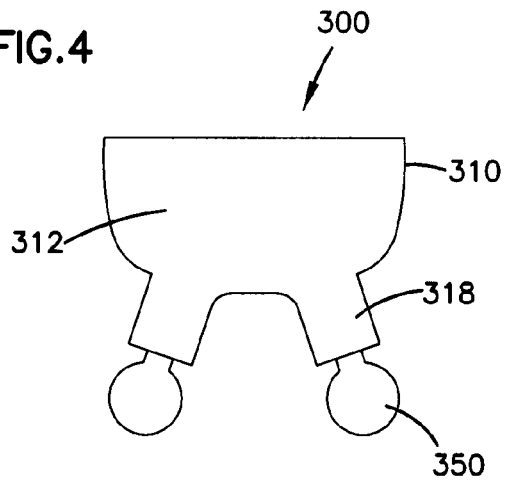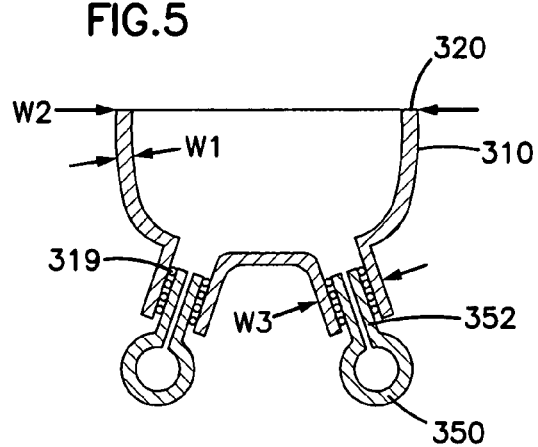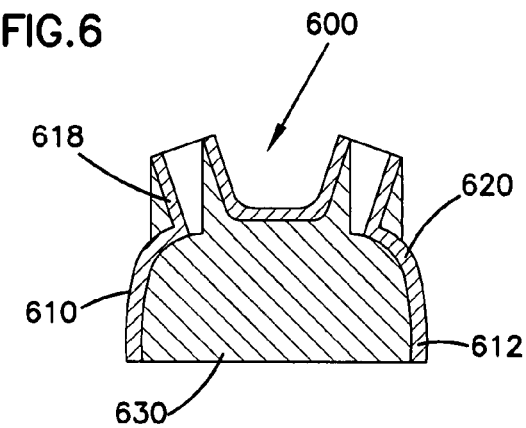

FIG.23
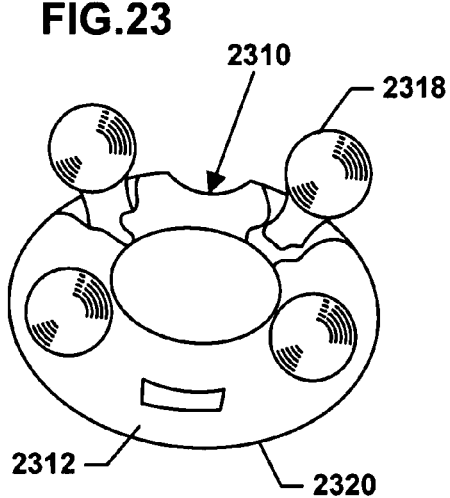
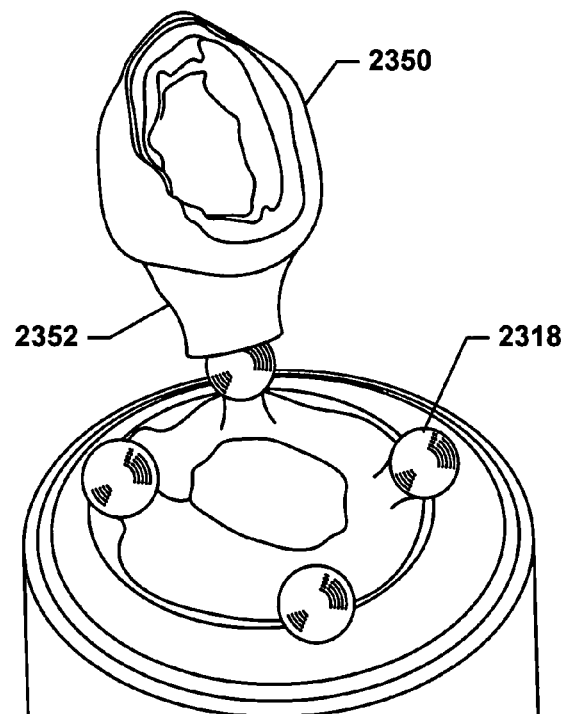
FIG.24
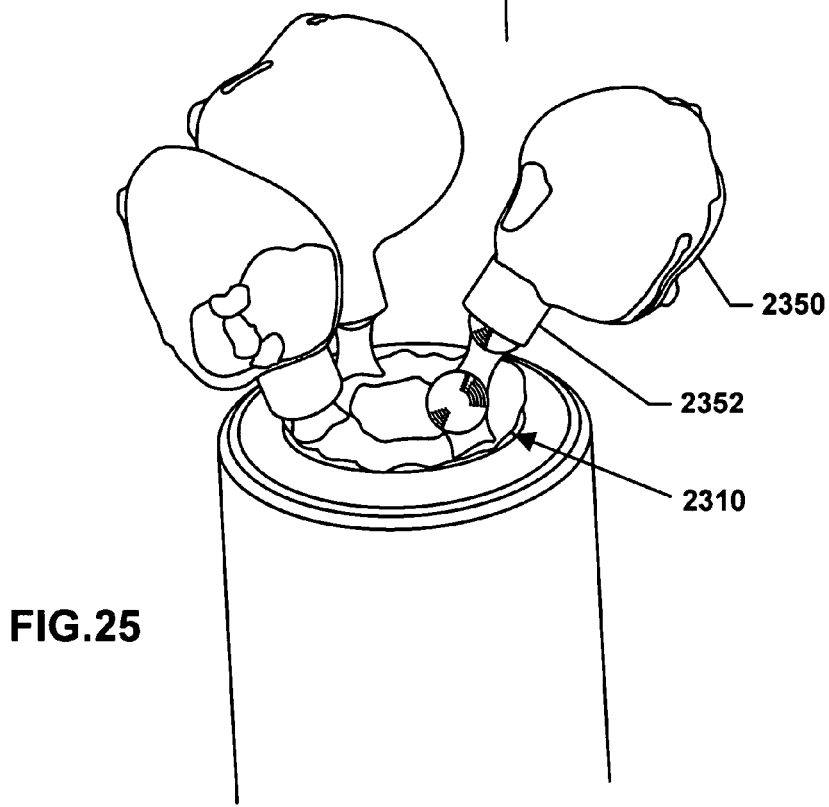
FIG.25

SPRUE FORMERS

CROSS REFERENCE

This application claims priority to U.S. Provisional Patent Application Ser. No. 60/857,600, filed on Nov. 7, 2006, the disclosure of which is hereby incorporated by reference herein.

TECHNICAL FIELD

This application relates generally to sprue formers for use in a lost-wax casting process; and more particularly to sprue formers for use in casting dental appliances and systems and methods for designing and fabricating the same.

BACKGROUND

A lost wax casting process can be used to produce casting molds for various products. The lost wax process includes forming a casting pattern of the desired finished product and surrounding the casting pattern with liquid investment during an investment phase. Typically, the casting pattern is made of wax or other such material. When the investment hardens, the casting pattern is eliminated (e.g., burned out) from the hardened investment during an elimination phase to provide a pattern cavity shaped like the casting pattern. Liquid and/or vapor solvents can also be used to remove the casting pattern. Material, such as molten metal or pressable ceramic, can be directed (e.g., poured or pressed) into the pattern cavity during a casting phase and allowed to cool in order to cast the desired product. The hardened investment is then destroyed to recover the casting.

To provide a path (i.e., a sprue) through the investment to the pattern cavity, a sprue former can be invested along with the casting pattern. The sprue former generally extends from the casting pattern to the exterior of the investment. Typically, the sprue former is made of the same material as the casting pattern and is eliminated along with the casting pattern during the elimination phase. The resulting sprue directs the casting material through the hardened investment to the pattern cavity during the casting phase. After the casting material hardens, excess material hardened in the sprue is removed from the casting.

To produce dental prostheses (e.g., dental copings, dental crowns, etc.) using the process described above, technicians obtain electronic models of dentitions of patients. The technicians can design electronic models of dental prostheses based on the electronic models of the dentitions. In some prior systems, the technicians obtain impressions and/or plaster models of the dentitions from dentists or other dental/orthodontic professionals. The impressions and/or models can be scanned to produce electronic models of the dentitions. In other prior systems, electronic images can be obtained by directly scanning the mouths of the patients. Rapid prototyping (i.e., automated prototyping) techniques can print casting patterns based on the prostheses models. Such casting patterns can be used in forming casting molds using the lost wax process described above. The prostheses can be cast from metal, ceramic, or a combination of the two using the casting molds.

As dental prostheses tend to be small, multiple prostheses are typically cast simultaneously. This simultaneous casting is accomplished using a multi-piece sprue former. A multi-piece sprue former is a structure designed to leave a series of interconnected channels or passageways within the hardened investment connecting each of the pattern cavities to the exterior of the investment. Molten casting material can be poured into the series of sprues and thereby directed to each pattern cavity.

There exists a need in the art for improved sprue formers.

SUMMARY

The invention relates to designing and constructing sprue formers for use in a lost-wax casting process. More particularly, the invention relates to designing and fabricating generally hollow sprue formers.

A sprue former having features that are examples of inventive aspects according to the principles of the present disclosure generally includes an at least partially hollow shell or body configured to couple to one or more casting patterns. The sprue former and the casting patterns can be invested and later eliminated from the hardened investment to produce a casting mold. Utilizing a generally hollow sprue former tends to inhibit deformation of the investment (i.e., the casting mold) during the elimination phase.

It is believed that some elimination techniques cause expansion or deformation of some types of materials typically used to form sprue formers. Such expansion or deformation can, at best, yield a deformed casting and, at worst, destroy the casting mold before the casting phase begins. By forming a sprue former with a hollow body, however, the material of which the sprue former is comprised has room to expand inwardly or collapse in on itself before applying significant pressure to the surrounding investment in the event of expansion or shrinkage of the sprue former material.

According to one aspect, a method of creating a casting mold includes generating an electronic model of a hollow sprue former and printing a sprue former based on the electronic model. Printing the sprue former includes printing a sprue former body with a first wax and printing a support structure with a second wax. The support structure corresponds to portions of the sprue former that are intended to be hollow (e.g., the physical space in which the second wax resides becomes the hollow void within the body). The method further includes removing the support structure to provide a generally hollow sprue former.

In one embodiment, removing the support structure includes immersing the printed sprue former in a solvent to dissolve the second wax and leave the first wax intact.

In another embodiment, removing the support structure includes vaporizing the second wax.

According to another aspect, the hollow body of the sprue former typically includes an inlet forming member and at least one first interface member. The inlet forming member is sized to provide an inlet cavity in the casting mold to enable casting material to enter the casting mold. The at least one first interface member is configured to couple to a casting pattern.

In certain embodiments, the hollow body can include a reservoir forming member and one or more connecting members coupling the reservoir forming member to the inlet forming member.

In some embodiments, the body of the sprue former can be sized to facilitate the flow of pressable ceramic through a casting mold created with the sprue former.

In other embodiment, the body of the sprue former can be sized to facilitate the flow of molten metal through a casting mold created with the sprue former.

In some embodiments, the first interface member can be configured to couple to a second interface member extending from a casting pattern.

In one example embodiment, the second interface member is configured to telescope into the first interface member.

In another example embodiment, the hollow body of the sprue former has a width ranging from about 0.1 millimeters to about 0.5 millimeters.

In yet another example embodiment, the sprue former includes multiple first interface members and each first interface member is configured to couple to a casting pattern.

These and various other features and advantages will be apparent from a reading of the following detailed description and a review of the associated drawings.

BRIEF DESCRIPTION OF THE DRAWINGS

Referring now to the drawings:

FIG. 1 illustrates an operation flow for a fabrication process for producing a sprue former having features that are examples of inventive aspects in accordance with the principles of the present disclosure;

FIG. 3 is a perspective view of an electronic model of a sprue former according to one embodiment of the present disclosure;

FIG. 4 is a front view of the electronic model of FIG. 3 coupled to electronic models of casting patterns according to one embodiment of the present disclosure;

FIG. 5 is a cross-sectional view taken along the line 5-5 of FIG. 3;

FIG. 6 illustrates the cross-section of a sprue former fabricated based on the electronic model of FIG. 3 according to one embodiment of the present disclosure;

FIG. 7 is a flowchart depicting an operation flow for a fabrication process for designing and fabricating a sprue former according to one embodiment of the present disclosure;

FIG. 23 is a perspective view of an alternative embodiment of a sprue former having generally spherical inlet-forming members;

FIG. 24 illustrates a casting pattern being coupled to a generally spherical inlet-forming member of the sprue former of FIG. 23;

FIG. 25 illustrates the sprue former of FIG. 23 with three casting patterns coupled to the generally spherical inlet-forming members.

DETAILED DESCRIPTION

Figure 2:
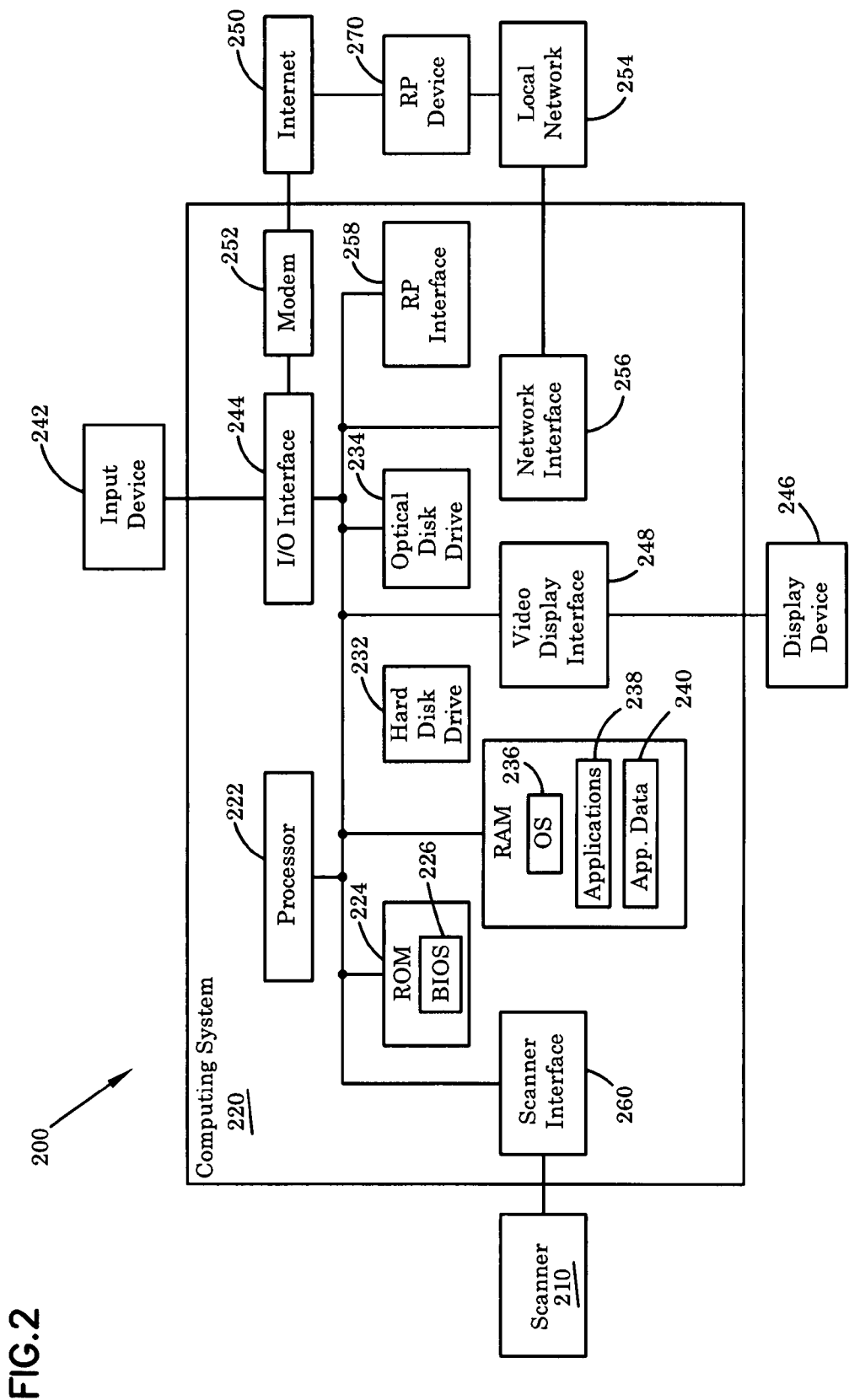
FIG. 2 illustrates an example design and production system on which example processes of the present disclosure can be executed according to one embodiment of the present disclosure.

This application relates generally to constructing sprue formers for use in a lost-wax casting technique; and more particularly to designing and fabricating generally hollow sprue formers for use in casting dental appliances.

FIG. 1 illustrates an operational flow for a fabrication process 100 for producing a sprue former, such as sprue former 310 (FIG. 3). The process 100 begins at start module 105 and proceeds to design operation 110. Design operation 110 generates an electronic model of a sprue former. In a preferred embodiment, the electronic model is designed using a computer aided design (CAD) type software program.

In some embodiments, the design operation 110 generates the electronic model of the sprue former based at least partially on one or more electronic models of objects to be cast (e.g., dental prostheses). In other embodiments, the design operation 110 generates the electronic model of the sprue former based at least partially on an electronic model of a standard sprue former stored in a library of electronic images. In one embodiment, the electronic model can be manually edited by an operator as desired.

A produce operation 115 fabricates a sprue former based on the electronic model generated in design operation 110. For example, the produce operation 115 can print a wax pattern of the sprue former using a rapid prototyping machine (i.e., or an automated prototyping machine). To print the pattern on such a machine, the electronic model of the sprue former is formatted to be readable by such a machine, as is known to those skilled in the art, and the formatted file is transmitted to the rapid prototyping machine. The process 100 ends at stop module 120.

FIG. 2 illustrates an example design and production system 200 on which example processes of the present disclosure can be executed. In general, the system 200 includes a computing system 220 and a fabrication device 270 coupled to the computing system 220. The computing system 220 is configured to implement the design operation 110 of FIG. 1 and generate electronic models. The computing system 220 is also configured to convert the electronic models into a file format the fabrication device 270 can process. The fabrication device 270 is configured to implement the print operation 115 of FIG. 1 and produce (e.g., print) objects based on the electronic models generated by the computing system 220.

One example of the computing system 220 includes a processor unit 222, read only memory (ROM) 224, random access memory (RAM) 228, and a system bus 230 that couples various system components including the RAM 228 to the processor unit 222. The system bus 230 may be any of several types of bus structures including a memory bus or memory controller, a peripheral bus and a local bus using any of a variety of bus architectures. A basic input/output system 226 (BIOS) is stored in ROM 224. The BIOS 226 contains basic routines that help transfer information between elements within the computing system 220.

The computing system 220 further includes a hard disk drive 232 for reading from and writing to a hard disk, a magnetic disk drive (not shown) for reading from or writing to a removable magnetic disk, and an optical disk drive 234 for reading from or writing to a removable optical disk such as a CD ROM, DVD, or other type of optical media. The hard disk drive 232, magnetic disk drive, and optical disk drive 234 can be connected to the system bus 230 by a hard disk drive interface (not shown), a magnetic disk drive interface (not shown), and an optical drive interface (not shown), respectively. The drives and their associated computer-readable media provide nonvolatile storage of computer readable instructions, data structures, programs, and other data for the computing system 220.

Although the exemplary environment described herein employs a hard disk drive 232, a removable magnetic disk, and removable optical disk drive 234, other types of computer-readable media capable of storing data can be used in the exemplary system. Examples of these other types of computer-readable mediums that can be used in the exemplary operating environment include magnetic cassettes, flash memory cards, digital video disks, and Bernoulli cartridges.

A number of program modules may be stored on the ROM 224, RAM 228, hard disk drive 232, magnetic disk drive, or optical disk drive 234, including an operating system 236, one or more application programs 238, other program modules, and program (e.g., application) data 240.

A user may enter commands and information into the computing system 220 through input devices 242, such as a keyboard, touch screen, and/or mouse (or other pointing device). Examples of other input devices may include a microphone, joystick, game pad, satellite dish, and document scanner. These and other input devices are often connected to the processing unit 222 through an I/O port interface 244 that is coupled to the system bus 230. Nevertheless, these input devices 242 also may be connected by other interfaces, such as a parallel port, game port, or a universal serial bus (USB). A monitor 246 or other type of display device is also connected to the system bus 230 via an interface, such as a video adapter 248. In addition to the display device 246, computing systems typically include other peripheral output devices (not shown), such as speakers and document printers.

The computing system 220 may operate in a networked environment using logical connections to one or more remote computers. The remote computer may be a personal computer, a server, a router, a network PC, a peer device or other common network node, and typically includes many or all of the elements described above relative to the computing system 220. In certain embodiments, the network connections can include a local area network (LAN) or a wide area network (WAN). Such networking environments are commonplace in offices, enterprise-wide computer networks, intranets, and the Internet 250.

When used in a WAN networking environment, the computing system 220 typically includes a modem 252 or other means for establishing communications over the wide area network, such as the Internet 250. The modem 252, which may be internal or external, can be connected to the system bus 230 via the I/O port interface 244. When used in a LAN networking environment, the computing system 220 is connected to the local network 254 through a network interface or adapter 256. In a networked environment, program modules depicted relative to the computing system 220, or portions thereof, may be stored in the remote memory storage device.

It will be appreciated that the network connections shown are exemplary and other means of establishing a communications link between the computers may be used.

In certain embodiments, the fabrication device 270 includes a rapid prototyping machine configured to print wax patterns. One example of such a rapid prototyping machine is the PatternMaster wax printer from Solidscape of Connecticut. However, any type of fabrication device 270 may be used without deviating from the spirit and scope of the disclosure. In certain embodiments, the fabrication device 270 can be connected to the computing system 220 via an appropriate interface 258.

The interface 258 can connected to the bus 230 such that the electronic model data may be retrieved from the appropriate or desired memory location. In some embodiments, the interface 258 converts the electronic models generated on the computing system 220 to a format readable by the fabrication device 270. In one example embodiment, the interface 258 converts the electronic model to an STL file. The converted file can be transmitted to the fabrication device 270 using a direct line connection or using a networked connection described above.

In certain embodiments, the design and production system 200 also includes a scanner 210 configured to obtain data upon which the generated electronic models are based. For example, a three-dimensional scanner 210 can be connected to the computing system 220 via an appropriate scanner interface 260. The scanner interface 260 is connected to the bus 230 such that the scanned data may be stored in the appropriate or desired memory location, manipulated by the CPU 222, displayed on the display device 246, etc. Preferred scanners include a laser line scanner arranged and configured for scanning dental study casts (e.g., plaster casts). However, any suitable scanner 210 may be used and a number of other methodologies might be employed to generate the scanned image data.

Portions of the preferred embodiment constructed in accordance with the principles of the present invention utilize a computer and are described herein as implemented by logical operations performed by a computer. The logical operations of these various computer implemented processes are generally performed either (1) as a sequence of computer implemented steps or program modules running on a computing system and/or (2) as interconnected machine modules or hardware logic within the computing system. The implementation is a matter of choice dependent on the performance requirements of the computing system implementing the invention. Accordingly, the logical operations making up the embodiments of the invention described herein can be variously referred to as operations, steps, or modules.

Referring now to FIGS. 3-5, an example sprue former 310 is shown. In general, the sprue model 310 includes a body or shell 320 (see FIG. 5) defining one or more hollow portions. Typically, the body 320 defining the hollow portions has a thickness W1 (FIG. 5) in the range of 0.1 millimeters to about 0.5 millimeters. In a preferred embodiment, the body 320 has a thickness W1 of about 0.25 millimeters.

Providing hollow portions within the sprue former 310 enables the sprue former 310 to collapse in on itself during the elimination phase of the lost-wax process. The hollow portions also provide space in which the material forming the sprue former 310 can expand, for example, due to heat, without swelling outwardly into the investment by a significant amount. Such expansion otherwise tends to cause deformation or destruction of the casting mold. Material expansion is especially likely when using a material with a significant plastic content.

In some embodiments, the sprue former 310 includes a substantially hollow, conduit-shaped body 320. However, the sprue former body 320 does not function as a conduit. Rather, the body 320 is used in forming the conduits (i.e., sprues) in the investment through which casting material will pass during the casting phase of the lost-wax process. In other embodiments, only portions or sections of the body 320 are hollow.

The body 320 typically includes an inlet forming member 312 and at least one first interface member 318 (e.g., see FIG. 4). As used herein, the term "member" can refer to a separately formed piece, a distinct section, or an indistinct section of a whole. For example, in the embodiment shown in FIG. 4, the term inlet forming member 312 refers to a section of the body 320 protruding outwardly from the body 320. In another embodiment, however, the term inlet forming member 312 can simply designate a portion (e.g., an end) of the body 320.

In general, the first interface members 318 is located at a first end of each sprue former 310 and the inlet forming member 312 is located at an opposite, second end. For example, as shown in FIG. 4, the body 320 can include an inlet forming member 312 and at least one first interface member 318 extending from the inlet forming member 312. In other embodiments, however, the body can include additional portions extending between the inlet forming member 312 and the first interface member 318.

The inlet forming member 312 of each sprue former 310 is generally configured to displace a sufficient amount of investment when forming a casting mold 1700 (see FIG. 19) to form an inlet cavity 1711 (FIG. 19) through which casting material can enter the casting mold 1700 during the casting phase of the lost-wax process. For example, the inlet forming member 312 can have an outer diameter W2 (FIG. 5) ranging from about six millimeters to about twenty millimeters. In a preferred embodiment, the inlet forming member 312 has an outer diameter W2 of about 12 millimeters.

Figure 19:
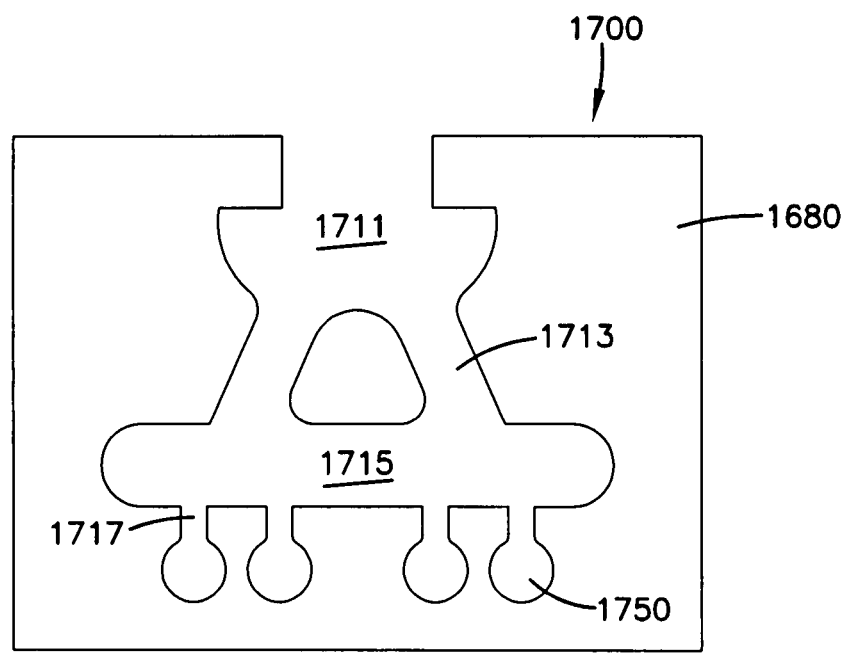
FIG. 19 illustrates an example casting mold resulting from the investment system of FIG. 18.

The first interface members 318 are configured to displace a sufficient amount of investment to create conduits 1717 (FIG. 19) in the casting mold 1700 leading to individual pattern cavities 1750 (FIG. 19). The conduits 1717 are sized to enable casting material to issue from the inlet cavity 1711 to the pattern cavities 1750. Typically, the first interface members 318 have a tubular shape. A diameter W3 (FIG. 5) of such a first interface member 318 can range from about two to about five millimeters. In a preferred embodiment, each of the first interface members 318 has a diameter W3 of about three millimeters.

In some embodiments, the casting patterns 350 are monolithically designed and fabricated with the sprue former 310. In other embodiments, the electronic models of the casting patterns 350 and sprue former 310 are separately generated, combined into one electronic model, and then printed monolithically. In still other embodiments, the first interface members 318 are designed and fabricated separately from the casting patterns 350. In such embodiments, the fabricated first interface members 318 are configured to couple to the fabricated casting patterns 350 (FIGS. 4 and 5). For example, the first interface members 318 of the sprue former 310 can couple to second interface members 352 (FIG. 5) extending from the casting patterns 350. Preferably, the fabricated interface members 318, 352 are secured together with an adhesive 319, such as cyanoacrylate. In another embodiment, the fabricated interface members 318, 352 are secured together with dental wax.

Figure 20:
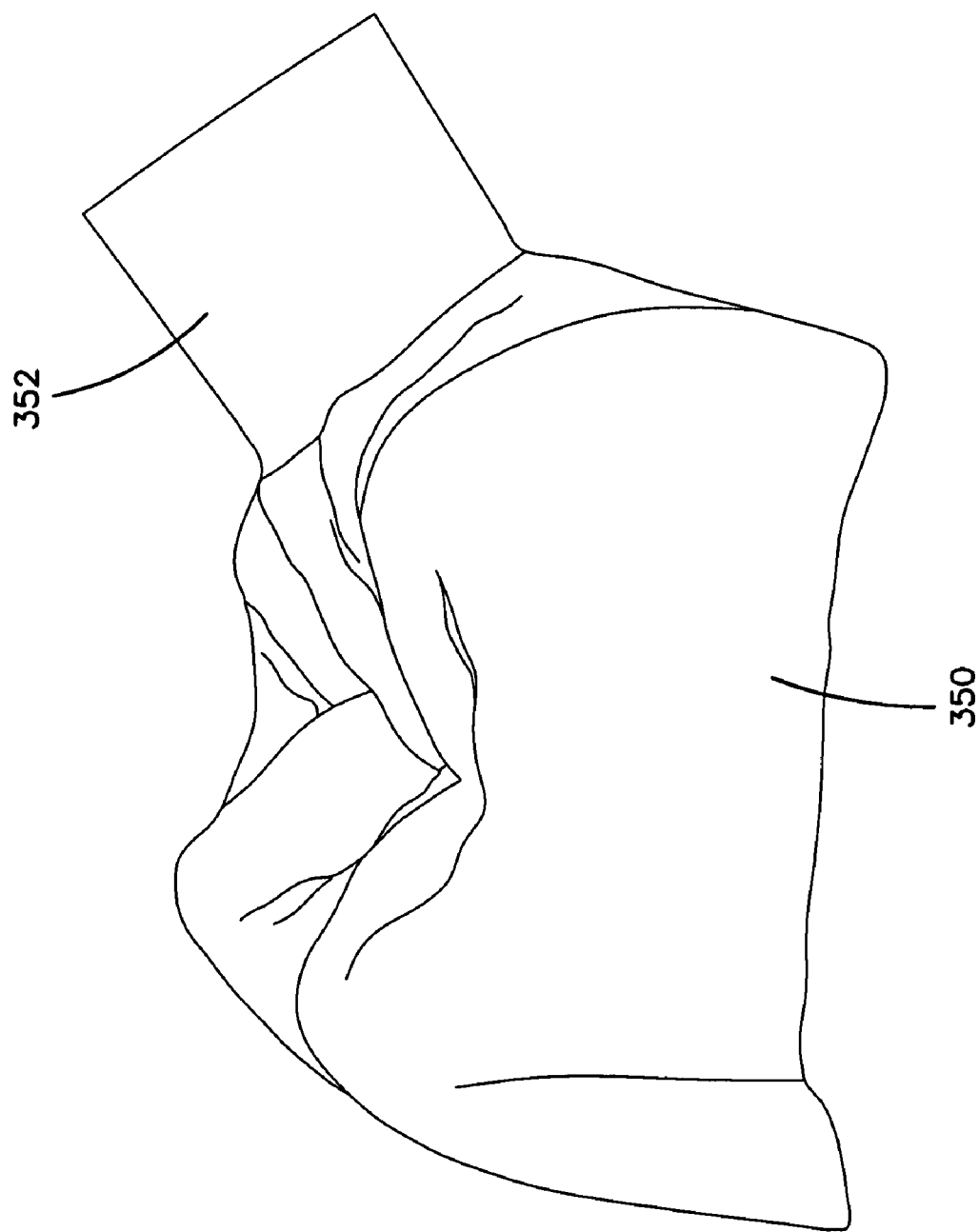
FIGS. 20-22 illustrate example casting patterns according to embodiments of the present disclosure.
Figure 21:
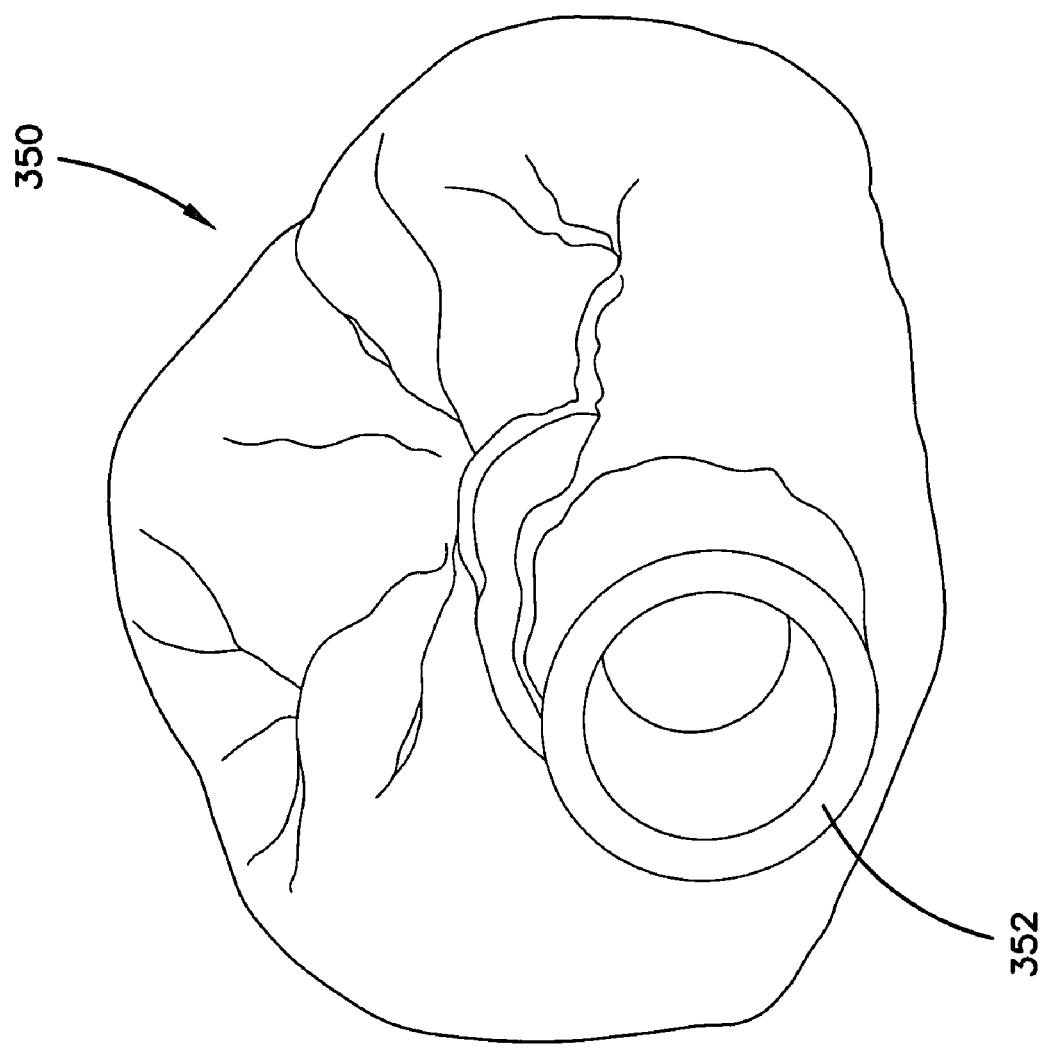
Figure 22:
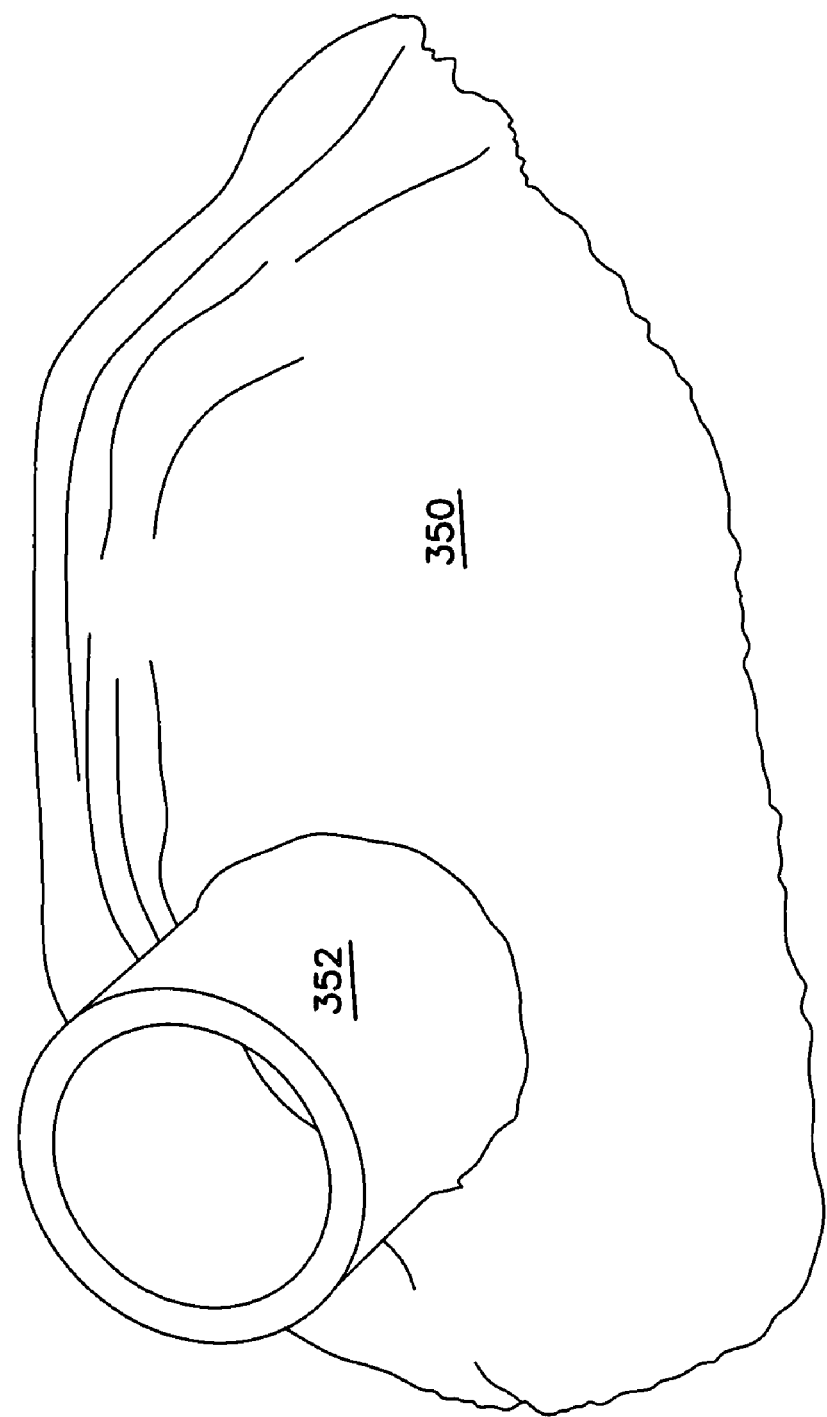

In certain embodiments, the second interface members 352 of the casting patterns 350 are also generally hollow or are configured with hollow sections to provide space into which material can expand or contract (e.g., see FIGS. 20-22). For example, in one such embodiment, one type of interface member 318, 352 can be configured to telescope into the other type of interface member 318, 352. In the example shown in FIG. 5, the second interface member 352 of the casting pattern 350 telescopes into the first interface members 318 of the sprue former 310. In still other embodiments, the first interface members 318 can attach directly to the casting patterns 350.

Figure 6A:
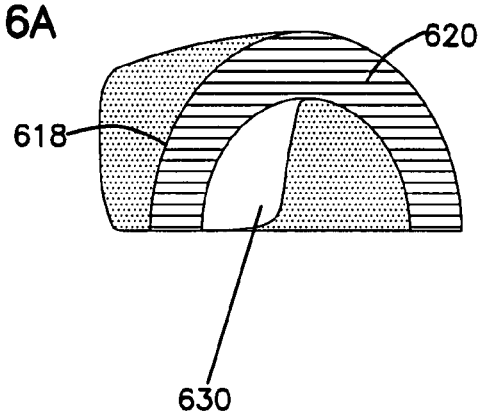
FIG. 6A is a cross-sectional view of a first interface member of the fabricated sprue former shown in FIG. 6.
Figure 9:
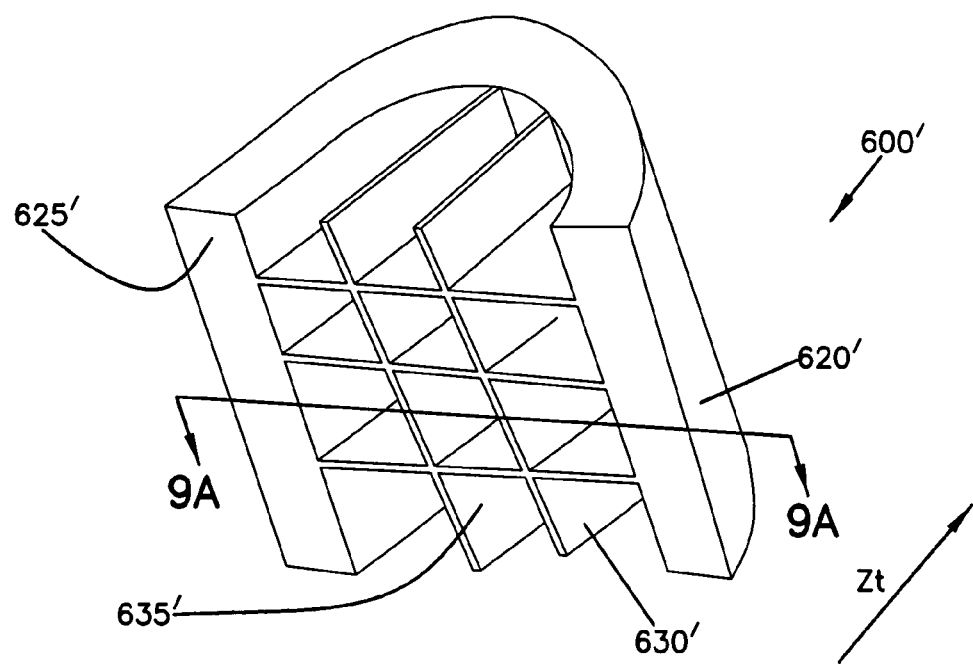
FIG. 9 illustrates a portion of a sprue former fabricated based on one piece of an the electronic model according to one embodiment of the present disclosure.
Figure 9A:
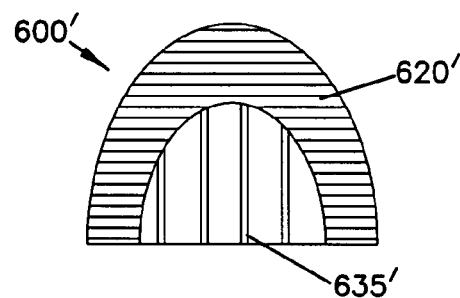
FIG. 9A is a cross-sectional view taken along the 9A-9A line of FIG. 9.

Referring to FIGS. 6-9, an electronic model 300 (FIG. 3) of a sprue former 310 can be fabricated into a pattern using one or more types of material. For example, FIG. 6 illustrates a fabricated pattern 600 of a sprue former 610 including a body 620 and a support structure 630. Typically, the body 620 and support structure 630 of the sprue former 610 are formed from wax materials. In other embodiments, however, the body 620 and support structure 630 can be formed from any suitable material, such as polymer, wax, and other such prototyping materials.

In general, the support structure 630 serves as a foundation for regions of the body 620 that taper outwardly significantly or for layers that would otherwise extend beyond the support of a previous layer. In some embodiments, the support structure 630 is printed in a different material from the body 620. Typically, in such embodiments, the support structure 630 is a substantially solid-mass printed in areas corresponding to hollow areas on the electronic model 300 (see e.g., FIG. 6). I FIG. 7 illustrates one example operation flow for a fabrication process 700 for printing a pattern 600, such as the sprue former 610, using two different materials. The fabrication process 700 begins at start module 705 and proceeds to a print operation 710. The print operation 710 includes printing the body 620 of the sprue former 610 using a first type of material (e.g., a prototyping wax). In a preferred embodiment, the print operation 710 prints the body 620 layer-by-layer on a rapid prototyping machine. In such an embodiment, the print operation 710 also prints the support structure 630 (FIG. 6) corresponding to the hollow portions defined by the body 620 using a second type of material (e.g., a support wax).

An eliminate operation 715 removes the support structure 630 from the fabricated body 620. Eliminating the support structure provides hollow regions in the sprue former 610 (see FIGS. 11, 13, and 15). Typically, the material forming the body 620 has a higher melting and/or sublimation point than the material forming the support structure 630. In such embodiments, the eliminate operation 715 heats the printed sprue former 610 to melt or vaporize the material forming the support structure 630 while leaving intact the material forming the body 620. In other embodiments, the eliminate operation 715 can immerse the sprue former 610 in a chemical solvent to dissolve the material forming the support structure 630, but not the material forming the body 620. The fabrication process 700 ends at stop module 720.

Figure 8:
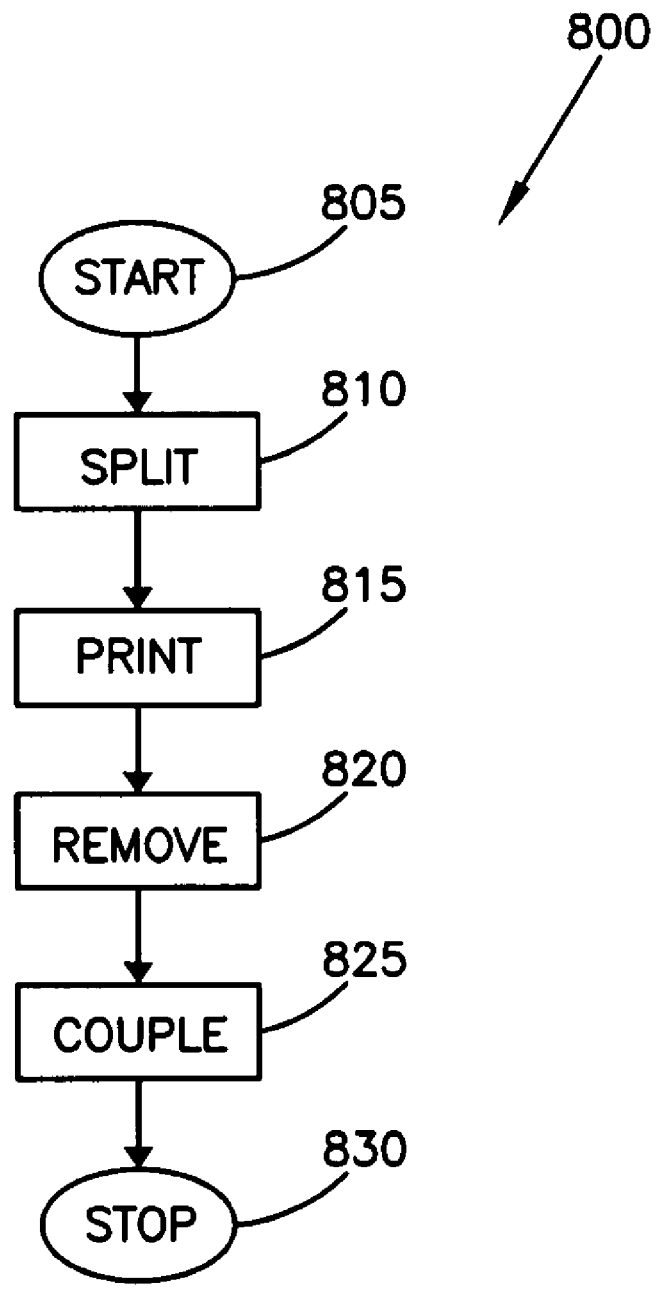
FIG. 8 is a flowchart depicting an operation flow for another fabrication process for designing and fabricating a sprue former according to one embodiment of the present disclosure.

FIG. 8 illustrates another example operation flow for a fabrication process 800 for printing an example pattern 600' using only one material. The fabrication process 800 begins at start module 805 and proceeds to a split operation 810. The split operation 810 divides an electronic model on which the pattern 600' is based into two or more pieces. Preferably, the split operation 810 defines the parting line of the electronic model along a plane extending through a region intended to be hollow.

A print operation 815 prints each of the bodies 620' corresponding to the pieces of the divided electronic model using a first material (e.g., a prototyping wax). In a preferred embodiment, the print operation 815 prints each of the bodies 620' layer-by-layer on a rapid prototyping machine. The print operation 815 also prints ribs 635' (see e.g., FIG. 9) or other support structures 630' extending along the hollow regions of the each body 620'. Preferably, the support structures 630' are printed in the same material as the body 620'. The print operation 815 is repeated for each piece of the divided electronic model.

A remove operation 820 removes the support structures 630' (e.g., the ribs 635' shown in FIG. 9) from the fabricated bodies 620'. Eliminating the support structures 630' provides grooves that, when coupled to the grooves of other pieces along the parting lines 625' of the bodies 620' of the other pieces, form hollow channels. Generally, the material forming the ribs 635' can be removed manually from the body 620. Preferably, the ribs 635' are cut from the bodies 620' using a knife edge or other sharp implement. The ribs 635' also can be formed to be snapped off from the bodies 620'.

An assemble operation 825 arranges and couples together the fabricated bodies 620' of the electronic model pieces along the parting lines 625' of the bodies 620'. For example, the assemble operation 825 can secure the bodies 620' together using an adhesive, such as cyanoacrylate, or additional dental/prototyping wax. Preferably, the bodies 620' are fabricated with alignment members (not shown), such as pins and slots that engage when the fabricated bodies 620' are correctly assembled. The fabrication process 800 ends at stop module 830.

Referring now to FIGS. 10-15, in general, the size and arrangement of the sprue former is influenced by whether a metal casting or a ceramic casting is desired. For example, sprue formers configured to produce investment molds suitable for metal casting are designed to enable the flow of molten metal through a casting mold. Typically, the sprue formers are designed to ease material flow, to promote even cooling, and/or to provide a reservoir of material to accommodate material shrinkage.

In contrast, sprue formers configured to produce molds suitable for ceramic casting are designed to enable an adequate volume of pressed ceramic to reach the pattern cavities while minimizing material wasted during and after pressing. Because ceramic is more viscous than metal, ceramic must be pressed (i.e., forced) through the sprue passageways within the investment mold to reach the casting pattern cavities.

Figure 10:
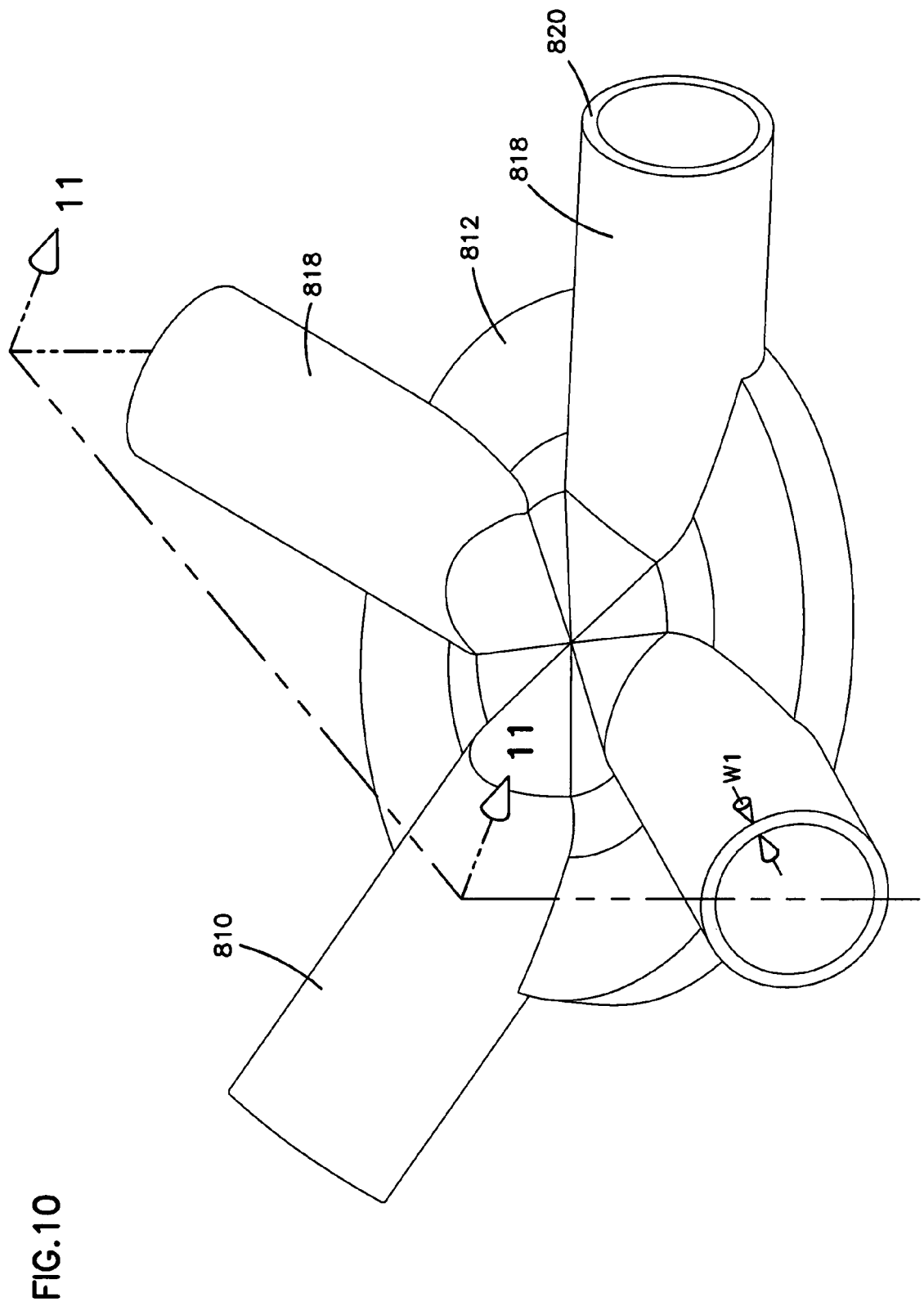
FIG. 10 illustrates an electronic model of an example sprue former configured for ceramic casting applications.
Figure 11:
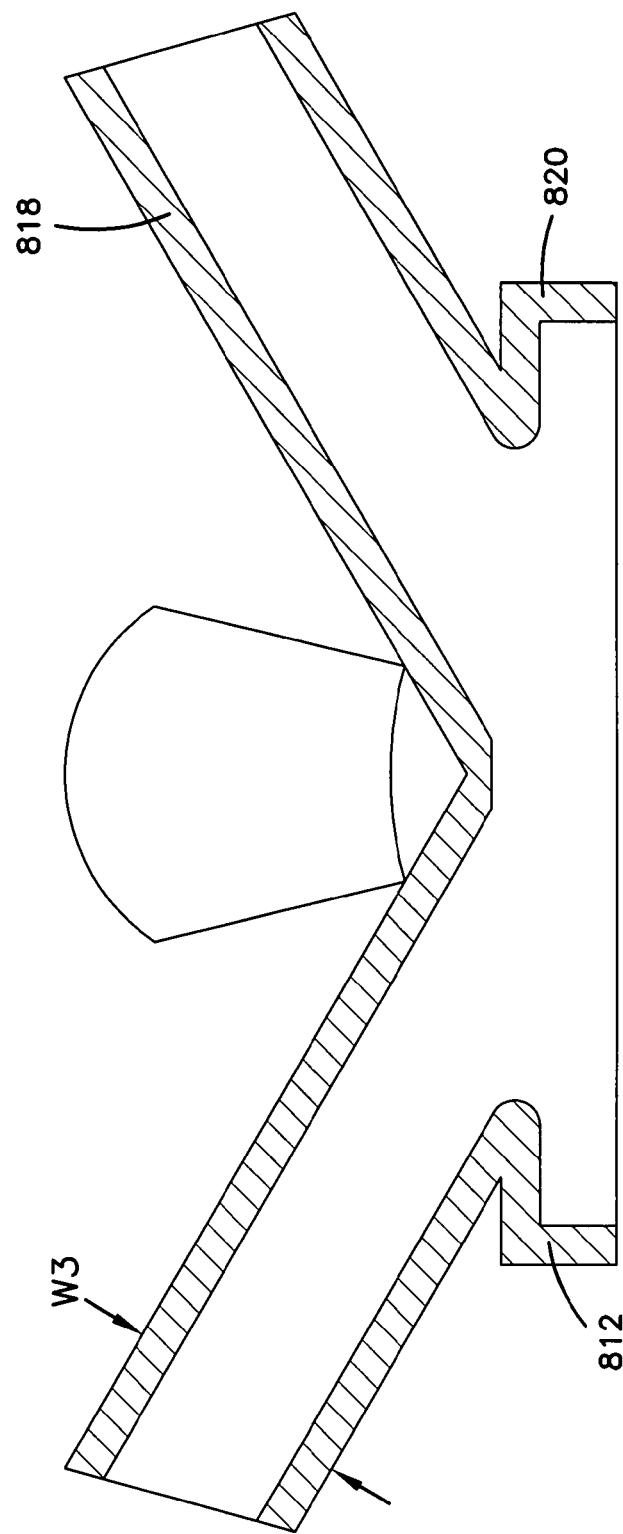
FIG. 11 is a cross-sectional view taken along the line 9-9 of FIG. 8.
Figure 12:
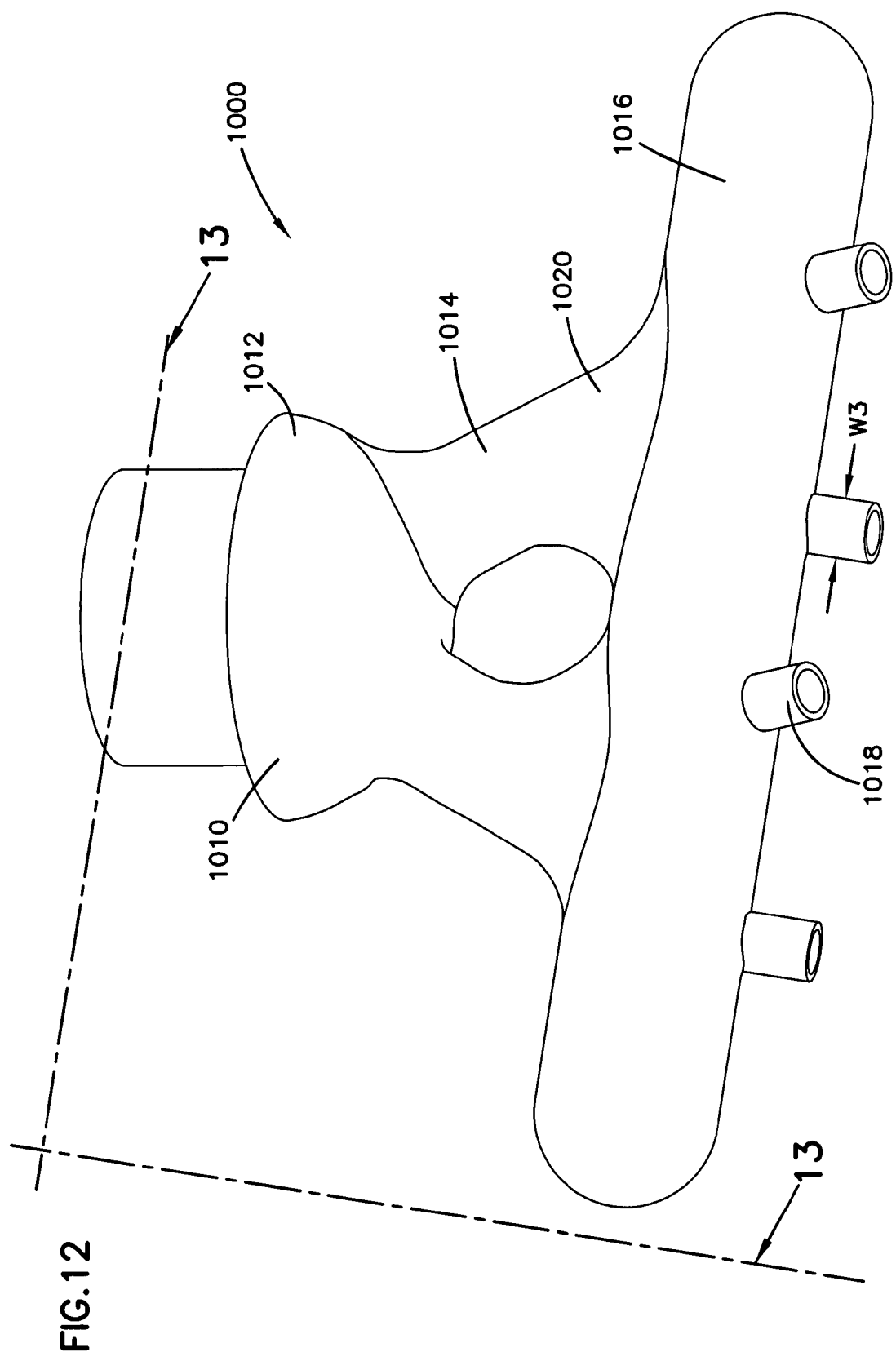
FIG. 12 illustrates an electronic model of an example sprue former configured for metal casting applications.

Sprue formers configured for pressed ceramic applications are typically smaller overall, but have larger interface members than metal casting sprue formers (compare FIGS. 10 and 12). Larger interface members facilitate material flow and decrease the likelihood of casting/pressing failure. For example, the width W3 (FIG. 11) of the interface members 818 designed for ceramic applications generally vary from about three millimeters to about four millimeters depending on design. In contrast, the width W3 (FIG. 12) of the first interface members 1018 of metal casting sprue formers 1010 generally range from about two and a half to about three and a half millimeters (see FIG. 12).

FIGS. 10 and 11 illustrate one example sprue former 810 configured for ceramic casting applications. The sprue former 810 includes a generally hollow body 820 having interface members 818 extending from an inlet forming member 812. The interface members 818 have relatively large diameters. The example shown is configured to couple to four casting patterns.

Figure 13:
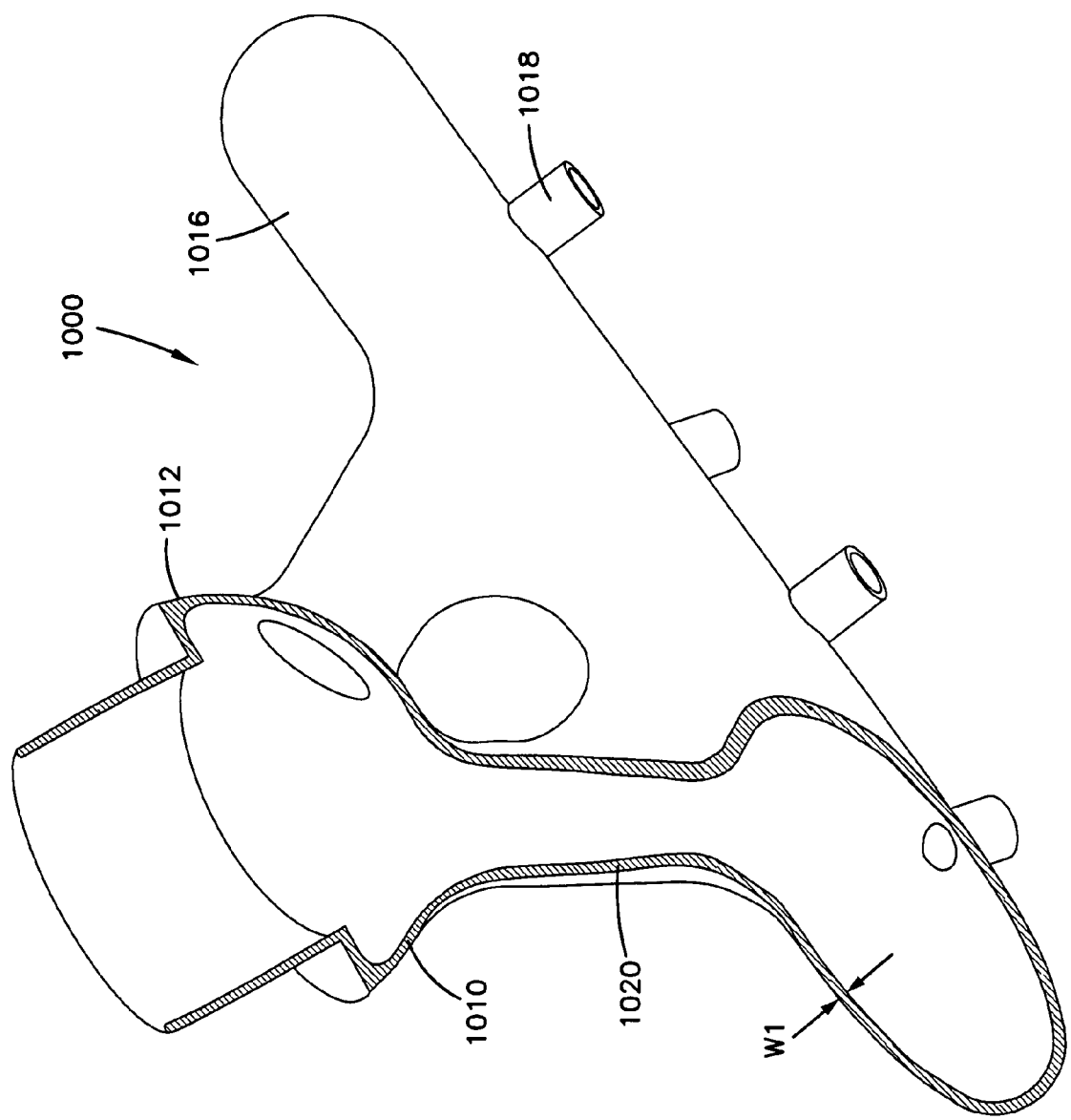
FIG. 13 is a cross-sectional view taken along the 13-13 line of FIG. 12.

FIGS. 12 and 13 illustrates a sprue former 1010 configured for use in metal casting applications. The sprue former 1010 includes a generally hollow body 1020. The sprue former 1010 also includes an inlet forming member 1012 coupled to one or more interface members 1018. In the example shown, the sprue former 1010 includes four interface members 1018.

Extending between the inlet forming member 1012 and the first interface members 1018 are connecting members 1014 and a reservoir forming member 1016. In general, the connecting members 1014 are configured to form passageways 1713 in the casting mold 1700 to direct casting material from the inlet 1711 to a reservoir cavity 1715 formed by the reservoir forming member 1016. The reservoir cavity 1715 is configured to provide a site in which casting material can accumulate. The collected casting material can flow from the reservoir cavity 1715 through the conduits 1717 to the pattern cavities 1750 when necessary during cooling.

In some embodiments, the reservoir forming member 1016 is generally linear (e.g., see FIGS. 12-13). Such reservoir forming members 1016 are typically referred to as "bar sprue formers." In other embodiments, however, the reservoir forming members has a ring shape (e.g., see FIGS. 12-13 at 1216). Such reservoir forming members 1216 are typically referred to as "ring sprue formers." The length of the "bar" and the diameter of the "ring" can change to accommodate different numbers of casting patterns.

Figure 14:
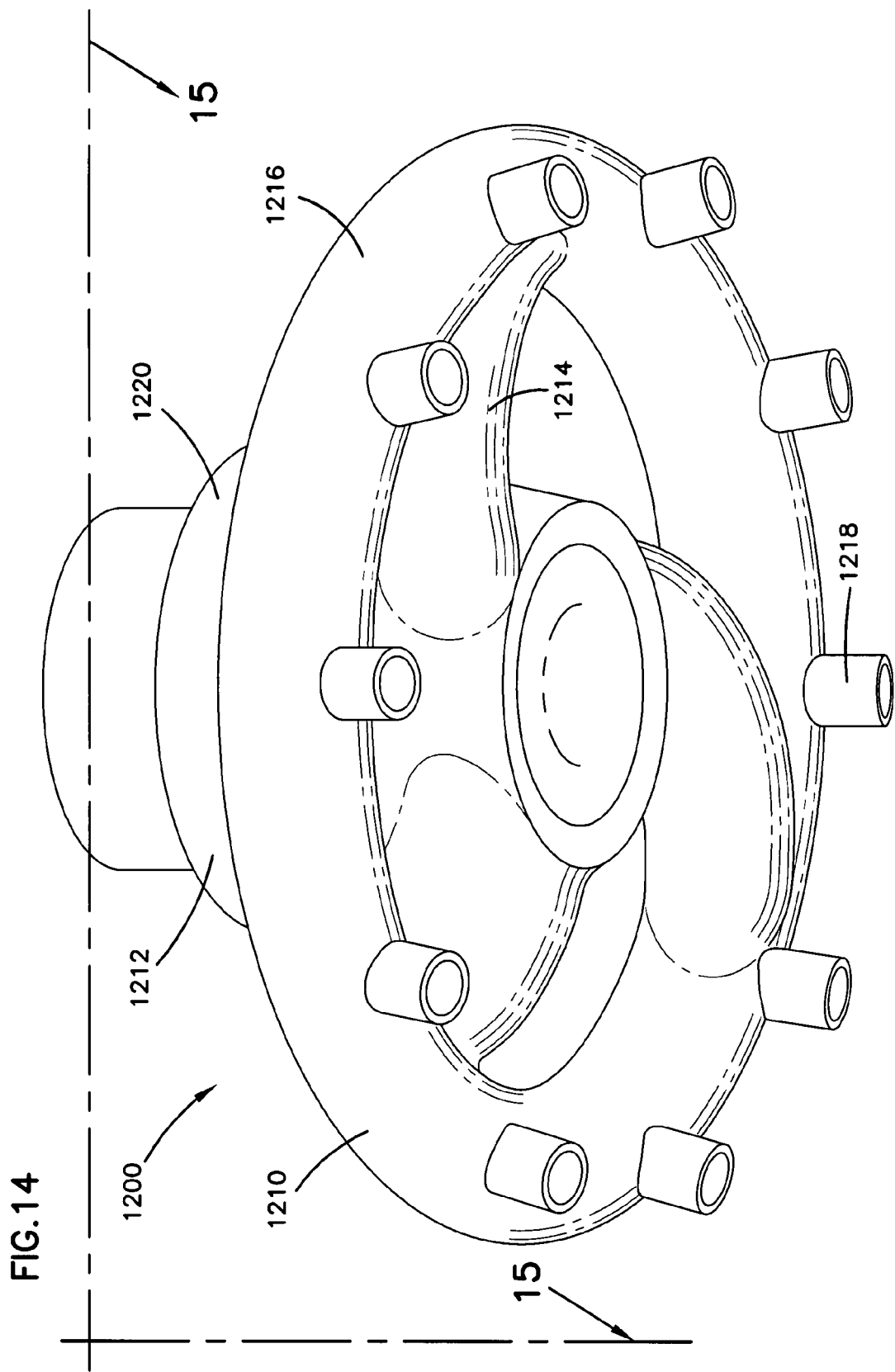
FIG. 14 illustrates an electronic model of another example sprue former configured for metal casting applications.
Figure 15:
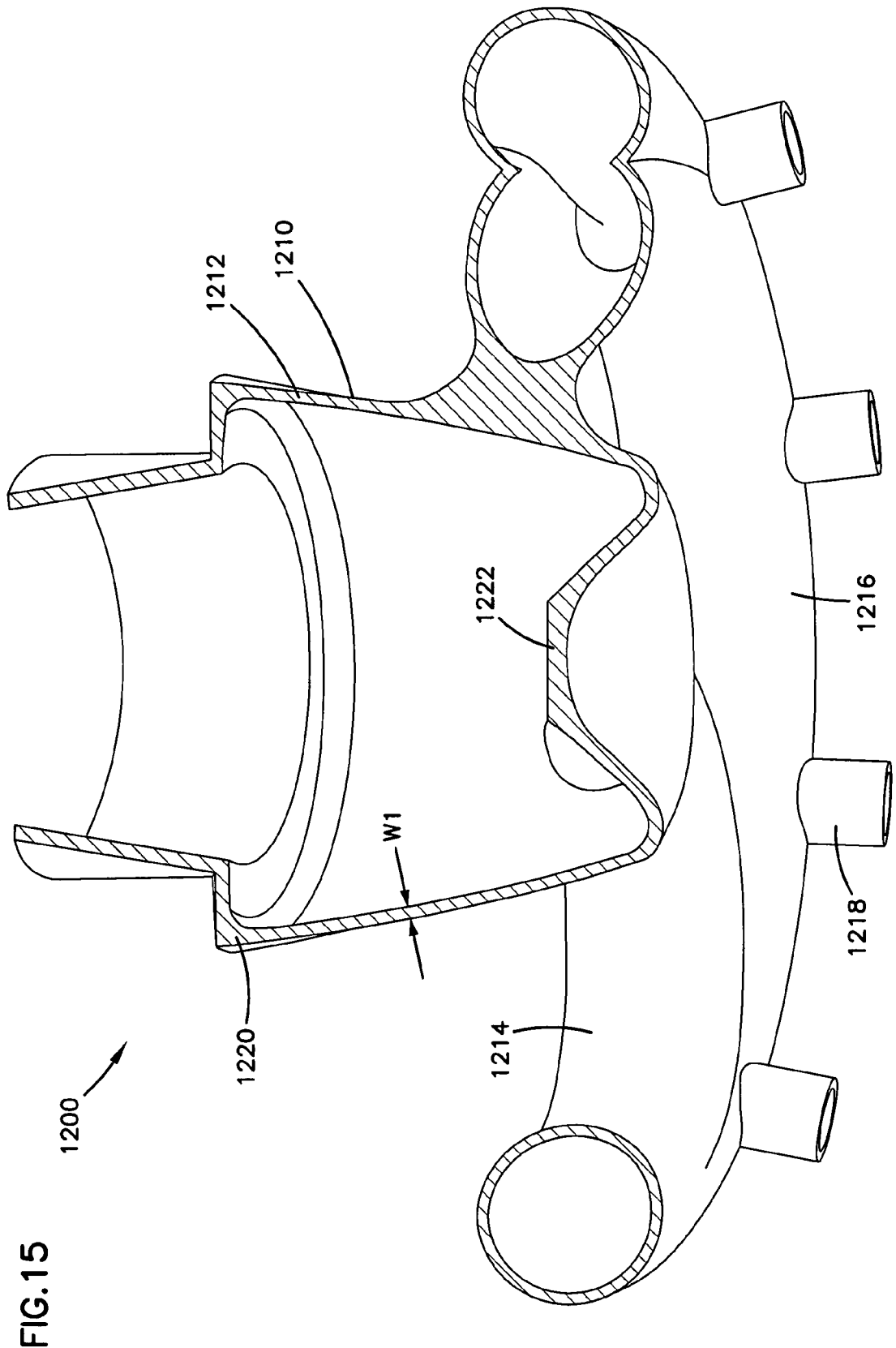
FIG. 15 is a cross-sectional view taken along the 15-15 line of FIG. 14.

FIGS. 14 and 15 illustrate a ring sprue former 1210 configured for metal casting applications. The sprue former 1210 is configured to mate with ten casting patterns. The sprue former 1210 includes a generally hollow body 1220 having an inlet former 1212, connecting members 1214, a reservoir former 1216, and ten interface members 1218. A section 1222 of the inlet former 1212 depresses inwardly into the body 1220. The section 1222 will form a protrusion (not shown) in the casting mold 1700 that will discourage collection of the casting material in the inlet 1711 and will aid in directing the flow of molten material to the passageways 1713, the reservoir 1715, and the conduits 1717.

Figure 16:
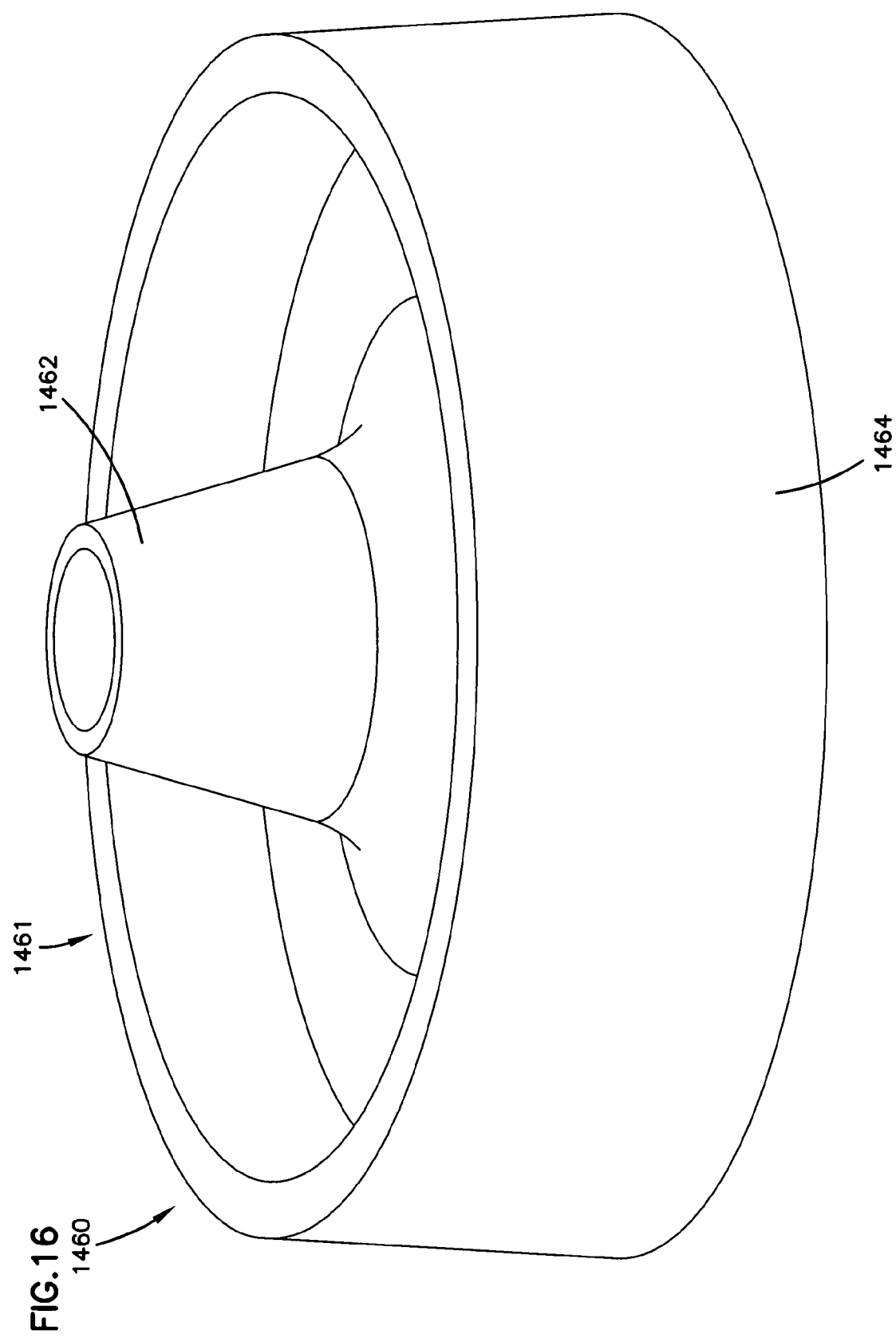
FIG. 16 is a perspective view of an example sprue base configured to couple to a ring sprue former.
Figure 17:
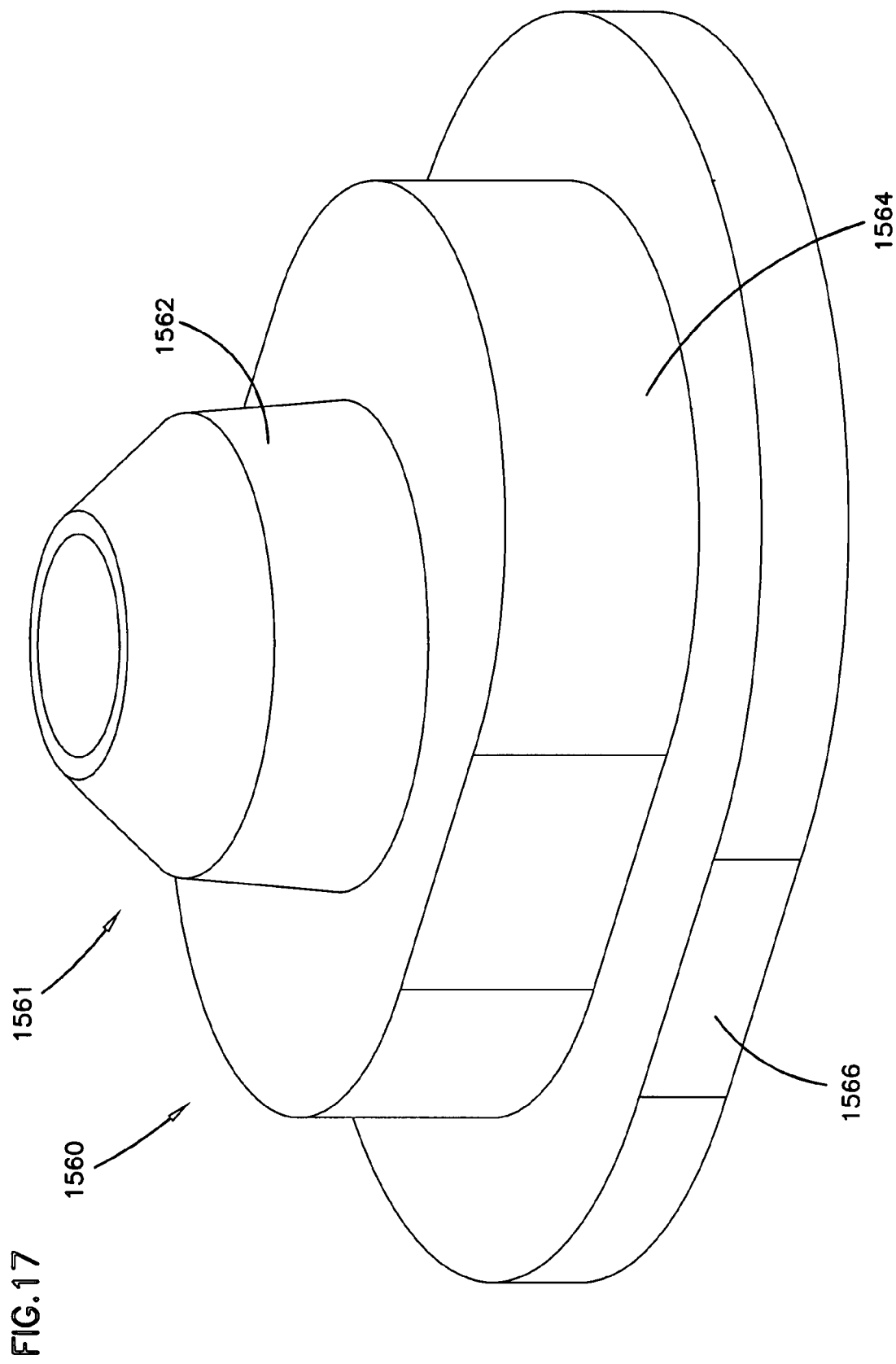
FIG. 17 is a perspective view of an example sprue base configured to couple to a bar sprue former.

Referring now to FIGS. 16-17, an inlet forming member of a sprue former is configured to secure to a sprue base prior to the investing phase of the lost-wax process. A sprue base can vary in size and shape depending on the number of patterns to be cast, the casting material to be used, and the type of sprue former utilized. In general, a sprue base includes an attachment portion and a sealing portion. The attachment portion is configured to couple to the inlet forming member of a sprue former. The sealing portion is configured to secure the sprue base to an investment container (see FIG. 18).

FIG. 16 illustrates an example sprue base 1460 having a first side 1461 and an opposite, second side (not shown). The first side 1461 of the sprue base 1460 includes an attachment portion 1462. The attachment portion 1462 of the sprue base 1460 is configured to attach to a ring sprue former, such as sprue former 1200. A sealing portion 1464 extends around the outer perimeter of the sprue base 1460. The sealing portion 1464 tapers outwardly from the first side 1461 to the second side to enable the sprue base 1460 to secure to a casting container, such as container 1670 of FIG. 18. In a preferred embodiment, the sealing portion 1464 is shaped to secure to a generally cylindrical casting container.

FIG. 17 illustrates an example sprue base 1560 having a first side 1561 and an opposite, second side (not shown). The first side 1561 of the sprue base 1560 includes an attachment portion 1562. The attachment portion 1562 of the sprue base 1560 is configured to attach to a bar sprue former, such as sprue former 1000. A sealing portion 1564 extends around the outer perimeter of the sprue base 1560. In a preferred embodiment, the sealing portion 1564 is shaped to secure to a generally oblong-shaped casting container. The sprue base 1560 also includes a border portion 1566 extending radially outwardly from one end of the sealing portion 1564 adjacent the second side.

Figure 18:
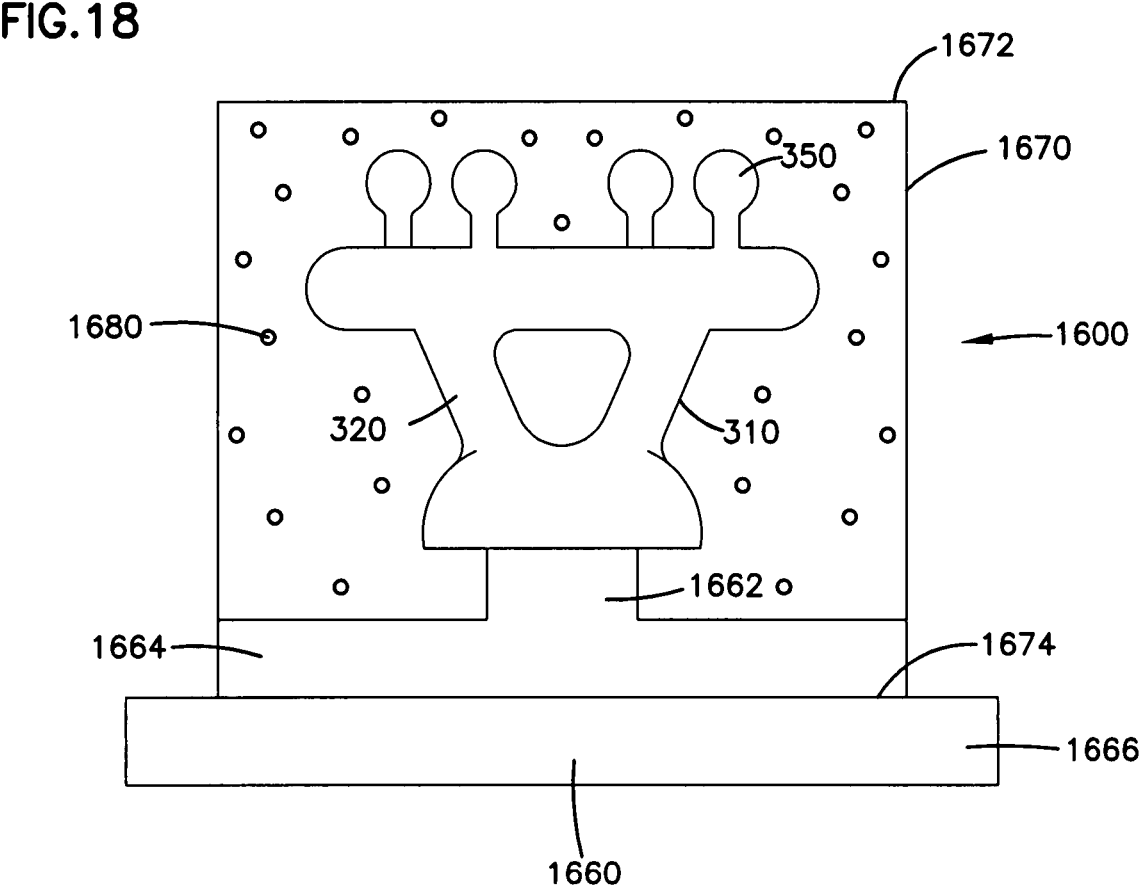
FIG. 18 illustrates an investment system configured to form a casting mold for casting four patterns.

Referring now to FIGS. 18-19, a sprue former, a sprue base, and one or more casting patterns are used in an investment system to form a casting mold. FIG. 18 illustrates an investment system 1600 including an investment container 1670 extending from a bottom 1672 to a mouth 1674. The container 1670 is configured to mount upside-down on a sprue base 1660. The mouth 1674 of the container 1670 fits over a sealing portion 1664 of the sprue base 1660. The sealing portion 1664 provides a seal between the container 1670 and the exterior of the container 1670. In one embodiment, the sprue base 1660 also includes a border portion 1666 extending beyond the mouth 1674 of the container 1670. The border 1666 facilitates removing the container 1670 from the base 1660.

A sprue former 310 is coupled to an attachment portion 1662 of the sprue base 1660 within the container 1670. Patterns to be cast 350 are coupled to the sprue former 310. The container 1670 is filled with investment material 1680. The investment material 1680 hardens around the sprue former 310 and casting patterns 350 to form a casting mold 1700 (FIG. 19). The casting patterns 350 and sprue former 310 can then be eliminated to provide the pattern cavities 1750 and sprue passageways 1711, 1713, 1715, 1717 in the casting mold 1700.

Pressable ceramic or molten metal can be pushed or poured into the casting mold 1700 to cast final products, such as dental prostheses. In some embodiments, molten metal is poured into the casting mold 1700 to form dental copings. In other embodiments, pressable ceramic is pushed into the casting mold 1700 to form dental crowns. A metal coping can be provided in a casting pattern cavity 1750 configured to form a dental crown. In such an embodiment, a pressable ceramic can be fused to the coping during the casting process to obtain a porcelain-fused-to-metal crown. Known casting techniques, such as vacuum casting and spin casting, can be used.

To obtain the cast product, the investment 1680 of the casting mold 1700 is broken. Destroying the casting mold 1700 exposes a casting in the shape of the casting patterns 350 and at least partially in the shape of the sprue former 310. The portions of the casting forming the casting patterns 350 are removed from the portions of the casting resembling the sprue former 310. For example, the casting pattern portions can be cut or broken off and sanded down to complete the casting process.

Referring to FIGS. 23-28, an alternative embodiment of a sprue former 2310 is shown. In general, the sprue former 2310 includes a body or shell 2320 (FIG. 23) defining at least one inlet forming member 2312 and one or more first interface members 2318 (e.g., see FIG. 23). In the example shown, the first interface members 2318 protrude from the inlet-forming member 2312 and are generally spherical or ball-shaped. In other embodiments, the first interface members 2318 protrude from an intermediate bar or ring portion of the sprue former 2310. The spherical first interface members 2318 enable rotational adjustment of casting patterns 2350 (FIG. 24) coupled to the first interface members 2318.

Figures 26, 27, 28:
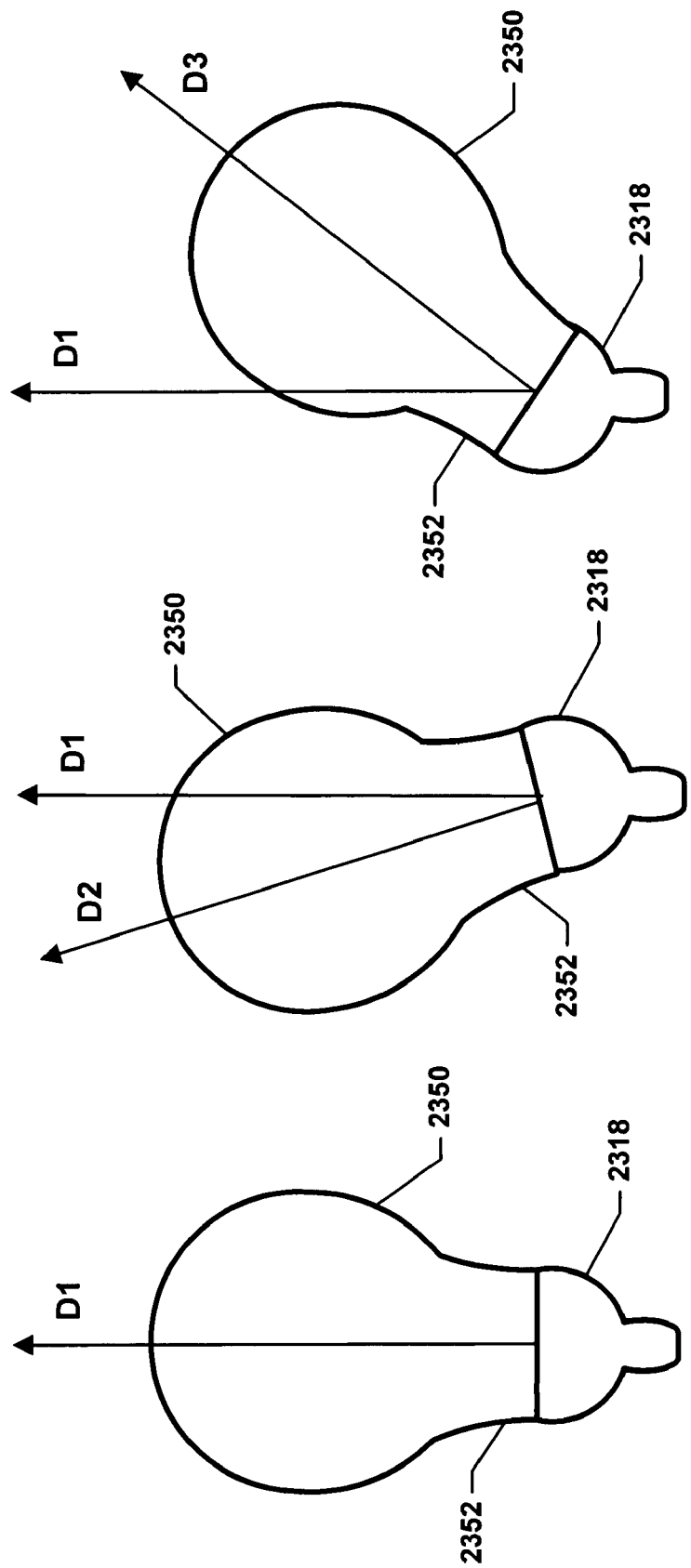
FIGS. 26-28 are schematic block diagrams illustrating a spherical first interface member that enables positioning of a casting pattern with greater freedom of orientation.

As shown in FIGS. 26-28, the spherical first interface members 2318 enable positioning of the casting patterns 2350 with greater freedom of orientation. For example, in FIG. 26, a second interface member 2352 of a casting pattern 2350 is positioned on a first interface member 2318 of a sprue former 2310 along a direction D1. In FIGS. 27 and 28, the casting pattern 2350 is tilted about the first interface member 2318 in different directions D2, D3, respectively. Enabling rotational adjustment provides greater freedom in arranging the casting patterns 2350 on the first interface members 2318, which may enable greater numbers of casting patterns 2350 to be arranged on the same sprue former 2310.

Alternatively, casting pattern orientation relative to the ring, bar, or inlet-forming member 2312 of the sprue former 2310 and relative to the neighboring patterns on the same sprue former 2310 can impact material flow during casting or pressing. Casting patterns 2350 may be arranged on the rounded first interface members 2318 with greater freedom to improve material flow during casting. Typically, the generally spherical first interface members 2318 are used in combination with small, ring-type sprue formers when pressing ceramic.

The body 2320 of the sprue former 2320 can be substantially hollow. In some embodiments, the generally spherical first interface members 2318 are substantially hollow. In other embodiments, however, the first interface members 2318 are solid. In general, the first interface members 2318 are sized to fit partially inside second interface members 2352 of the casting patterns 2350 (see FIG. 25). In an alternative embodiment, however, the first interface members 2318 are sized to fit completely within the second interface members 2352.

The above specification and examples provide a complete description of the manufacture and use of the invention. However, the foregoing description of the exemplary embodiments of the invention has been presented for the purposes of illustration and description only. They are not intended to be exhaustive or to limit the invention to the precise forms disclosed. It is to be understood that other embodiments may be utilized and operational changes may be made without departing from the scope of the present invention. Since many embodiments of the invention can be made without departing from the spirit and scope of the invention, the invention resides in the claims hereinafter appended.

We claim:

1. A sprue former of the type used to create a pathway in a casting mold from an exterior of the casting mold to at least one pattern cavity, each pattern cavity being defined by a casting pattern representing an item to be cast, the sprue former comprising:
a monolithic hollow wax body, the hollow wax body including an inlet forming member and a plurality of first interface members, the inlet forming member being configured to define an inlet cavity in the casting mold to enable casting material to enter the casting mold, and each of the first interface members including a conduit-shaped portion that is configured to define a passage in the casting mold enabling casting material to enter a respective pattern cavity from the inlet cavity, each first interface member being configured to enable rotational adjustment of an axial tilt of a second interface member of the respective casting pattern about the respective first interface member, the hollow wax body having been printed based on electronic models of the inlet forming member and the first interface members.

2. The sprue former of claim 1, wherein the first interface members define generally spherical balls; and the second interface member of each casting pattern defines a socket that is coupled to one of the generally spherical balls of the first interface members in a ball-and-socket joint.

3. The sprue former of claim 1, wherein the hollow wax body further comprises:

a reservoir forming member configured to provide a reservoir cavity in the casting mold in which a reserve of casting material accumulates; and at least one connecting member coupling the reservoir forming member to the inlet forming member, wherein each first interface member extends from the connecting member.

4. The sprue former of claim 3, wherein the reservoir forming member is bar-shaped.

5. The sprue former of claim 3, wherein the reservoir forming member is a ring-shaped.

6. The sprue former of claim 1, wherein the hollow body has a material thickness generally ranging from about 0.1 millimeters to about 0.5 millimeters.

7. The sprue former of claim 1, wherein each second interface member is configured to couple to the respective first interface member with adhesive or wax.

8. The sprue former of claim 7, wherein the second interface member is hollow.

9. The sprue former of claim 1, wherein the item to be cast is a dental prosthesis.

10. The sprue former of claim 2, wherein the balls of the first interface members are sized to fit partially within the sockets of the second interface members.

11. The sprue former of claim 1, wherein the hollow wax body is configured to be vaporized when heated.

12. The sprue former of claim 11, wherein the hollow wax body is configured to enable wax forming the body to deform into hollow portions of the wax body to inhibit outward deformation when the wax body is heated.

13. The sprue former of claim 1, wherein the inlet forming member has an outer diameter ranging from about six millimeters to about twenty millimeters.

14. The sprue former of claim 1, wherein each of the first interface members has a diameter ranging from about two to about five millimeters.

15. The sprue former of claim 1, wherein material forming the inlet forming member has a thickness ranging from about 0.1 millimeters to about 0.5 millimeters.

16. The sprue former of claim 1, wherein material forming the conduit-shaped portion of each first interface member has a thickness ranging from about 0.1 millimeters to about 0.5 millimeters.

17. The sprue former of claim 1, further comprising:

at least a first of the casting patterns representing a first item to be cast, the first casting pattern being mounted to one of the first interface members with the second interface member of the first casting pattern oriented along a first tilt direction; and a second of the casting patterns representing a second item to be cast, the second casting pattern being mounted to another of the first interface members with the second interface member of the second casting pattern oriented along a second tilt direction.

18. The sprue former of claim 17, wherein the first and second casting patterns are not monolithically formed with the hollow wax body.

19. The sprue former of claim 1, wherein the first interface member extends directly from the inlet forming member.

20. The sprue former of claim 3, wherein the first interface members are connected directly to the reservoir forming member.

21. The sprue former of claim 2, wherein the balls of the first interface members are sized to fit fully within the sockets of the second interface members.

22. The sprue former of claim 1, wherein the hollow wax body is configured to define a non-linear path between the inlet cavity and the passages.

* * * * *